(12) United States Patent
Kanou

(10) Patent No.: US 9,058,249 B2
(45) Date of Patent: Jun. 16, 2015

(54) VEHICLE CONTROL SYSTEM

(75) Inventor: Takeshi Kanou, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 92 days.

(21) Appl. No.: 13/990,631

(22) PCT Filed: Feb. 18, 2011

(86) PCT No.: PCT/JP2011/053548
§ 371 (c)(1),
(2), (4) Date: May 30, 2013

(87) PCT Pub. No.: WO2012/111152
PCT Pub. Date: Aug. 23, 2012

(65) Prior Publication Data
US 2013/0253731 A1    Sep. 26, 2013

(51) Int. Cl.
| | | |
|---|---|---|
| G05D 1/00 | (2006.01) |
| G06F 17/00 | (2006.01) |
| B60T 7/12 | (2006.01) |
| B60T 13/66 | (2006.01) |
| B60W 40/076 | (2012.01) |
| B60W 40/10 | (2012.01) |
| B60W 40/107 | (2012.01) |

(52) U.S. Cl.
CPC . *G06F 17/00* (2013.01); *B60T 7/12* (2013.01); *B60T 13/662* (2013.01); *B60T 2201/06* (2013.01); *B60W 40/076* (2013.01); *B60W 40/10* (2013.01); *B60W 40/107* (2013.01); *B60W 2520/06* (2013.01); *B60W 2520/10* (2013.01); *B60W 2520/105* (2013.01); *B60W 2520/28* (2013.01); *B60W 2550/142* (2013.01)

(58) Field of Classification Search
None
See application file for complete search history.

(56) References Cited

U.S. PATENT DOCUMENTS

| | | | | |
|---|---|---|---|---|
| 3,234,507 | A * | 2/1966 | Bohn | 340/437 |
| 2007/0061061 | A1* | 3/2007 | Salman et al. | 701/80 |
| 2009/0085309 | A1* | 4/2009 | Hirao et al. | 280/5.503 |
| 2010/0036564 | A1* | 2/2010 | Blaise et al. | 701/42 |
| 2010/0152973 | A1* | 6/2010 | Chung | 701/42 |
| 2011/0276216 | A1* | 11/2011 | Vaughan | 701/29 |
| 2012/0108387 | A1* | 5/2012 | Akebono et al. | 477/12 |
| 2013/0025957 | A1* | 1/2013 | Ellsworth | 180/210 |

FOREIGN PATENT DOCUMENTS

JP    05 272974    10/1993

OTHER PUBLICATIONS

International Search Report issued May 31, 2011 in PCT/JP11/053548 filed Feb. 18, 2011.

* cited by examiner

*Primary Examiner* — Calvin Cheung
(74) *Attorney, Agent, or Firm* — Oblon, McClelland, Maier & Neustadt, L.L.P.

(57) ABSTRACT

The vehicle control system controls a vehicle based on an estimated gradient value of a travel road. Further, the vehicle control system includes a front/rear acceleration sensor and wheel speed sensors, and a control device for calculating the estimated gradient value. Further, when the vehicle travels, the control device determines whether or not the vehicle is traveling rearward. Then, when the vehicle is traveling forward, the control device calculates the estimated gradient value based on an output signal of the acceleration sensor and output signals of the wheel speed sensors. In contrast, when the vehicle is traveling rearward, the control device calculates the estimated gradient value based on an output signal of the acceleration sensor.

6 Claims, 15 Drawing Sheets

FIG.13

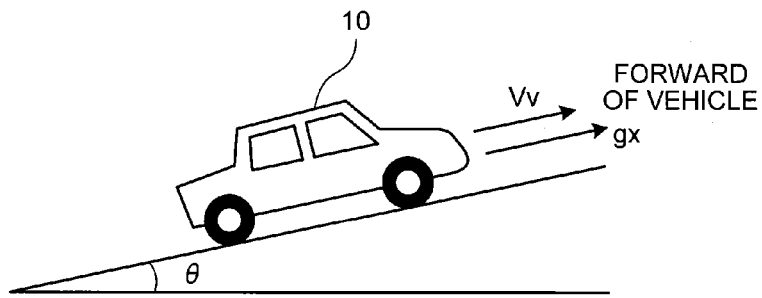

FIG.14

| | | ACTUAL TRAVEL DIRECTION | D START→ N STOP | D START→ D STOP | R START→ D or N STOP |
|---|---|---|---|---|---|
| FLAT ROAD | | FORWARD | DETERMINATION OF FORWARD TRAVEL | DETERMINATION OF FORWARD TRAVEL | ✗ |
| | | REARWARD | ✗ | ✗ | DETERMINATION OF REARWARD TRAVEL |
| DESCENDING ROAD | | FORWARD | DETERMINATION OF FORWARD TRAVEL | DETERMINATION OF FORWARD TRAVEL | DETERMINATION OF FORWARD TRAVEL |
| | | REARWARD | ✗ | ✗ | DETERMINATION OF REARWARD TRAVEL |
| ASCENDING ROAD | | FORWARD | DETERMINATION OF FORWARD TRAVEL | DETERMINATION OF FORWARD TRAVEL | ✗ |
| | | REARWARD | DETERMINATION OF REARWARD TRAVEL | DETERMINATION OF REARWARD TRAVEL | DETERMINATION OF REARWARD TRAVEL |

| ESTIMATED SLOPE ROAD VALUE S | ESTIMATED GRADIENT VALUE G | CONTROL MODE M (WHEN VEHICLE STOPS) |
|---|---|---|
| STEEP ASCENDING ROAD | $G \geq k1$ ($G \geq k1h$) | SHORT HOLD MODE |
| ASCENDING ROAD | $k2 \leq G < k1$ | HOLD MODE |
| FLAT ROAD | $k3 < G < k2$ | |
| DESCENDING ROAD | $k4 < G \leq k3$ | |
| STEEP DESCENDING ROAD | $G \leq k4$ ($G \leq k4h$) | OFF MODE |

ESTIMATED SLOPE ROAD VALUE S
WHEN VEHICLE TRAVELS FORWARD

TRANSITION OF CONTROL MODE OF BRAKE HOLD CONTROL

FIG.20
(a)
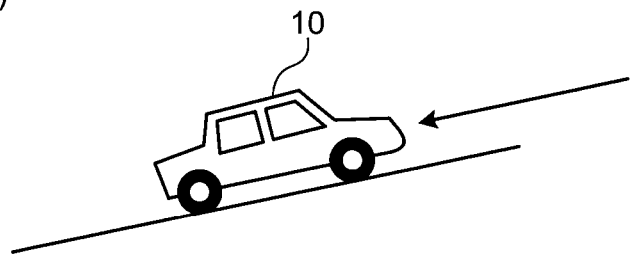
TRAVELING REARWARD
ON ASCENDING ROAD
(b)
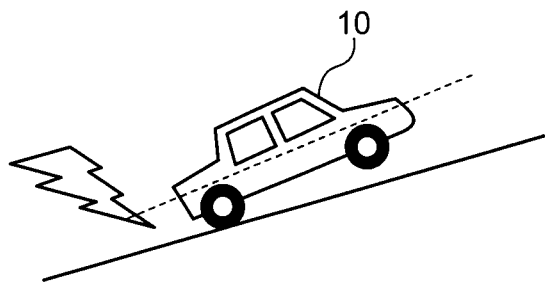
BRAKE IS DEPRESSED
(c)
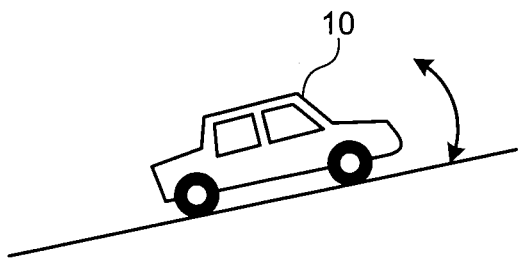
VEHICLE STOPS

VEHICLE CONTROL SYSTEM

FIELD

The present invention relates to a vehicle control system, and more particularly to a vehicle control system capable of improving an estimated accuracy of an estimated gradient value.

BACKGROUND

In recent vehicle control systems, a brake hold control is employed which keeps a stop state of a vehicle by holding a brake force of wheels under a predetermined condition when the vehicle stops. In the brake hold control, the stop state of the vehicle can be kept without the need for a driver to depress a brake pedal and further the vehicle can be started only by depressing an accelerator pedal while, for example, the vehicle travels on a slope road or in a traffic jam. As a result, a burden of a brake pedal operation of the driver is reduced. As a conventional vehicle control system employing the brake hold control, there is known a technology described in Patent Literature 1.

CITATION LIST

Patent Literature

Patent Literature 1: Japanese Patent Application Laid-open No. H05-272974

SUMMARY

Technical Problem

Here, in a brake hold control, an estimated gradient value of a travel road is estimated and a brake force control of wheels is executed based on the estimated gradient value. Accordingly, in the vehicle control system, there is a problem for improving an estimated accuracy of the estimated gradient value.

Thus, an object of the present invention, which was made in view of the circumstances, is to provide a vehicle control system capable of improving an estimated accuracy of the estimated gradient value.

Solution to Problem

In order to achieve the above mentioned object, a vehicle control system according to the present invention for calculating an estimated gradient value of a travel road includes an acceleration sensor that detects an acceleration of the vehicle; wheel speed sensors that detects wheel speeds of the vehicle; and a control device that calculates the estimated gradient value, wherein the control device determines a travel direction of the vehicle when the vehicle travels as well as when the control device determines that the vehicle is traveling in one of the travel directions of a forward travel and a rearward travel, the control device calculates the estimated gradient value based on an output signal of the acceleration sensor and output signals of the wheel speed sensors, and when the control device determines that the vehicle is traveling in the other travel direction, the control device calculates the estimated gradient value based on an output signal of the acceleration sensor.

Further, in the vehicle control system, it is preferable that the control device calculates the estimated gradient value based on an output signal of the accelerator sensor after a predetermined determination waiting time has passed after output signals of the wheel speed sensors had become zero.

Further, in the vehicle control system, it is preferable that when the control device classifies travel roads by comparing the estimated gradient value with a predetermined threshold value, the control device classifies the travel roads by providing a hysteresis with the threshold value when the control device determines that the vehicle is traveling in one of the travel directions, and the control device preferably classifies the travel roads using the single threshold value when the control device determines that the vehicle is traveling in the other travel directions.

Further, in the vehicle control system, it is preferable that the control device prohibits to update a result of classification of the travel roads after a predetermined determination waiting time has passed after output signals of the wheel speed sensors had become zero.

Advantageous Effect of Invention

In the vehicle control system according to the present invention, when a vehicle is traveling in another travel direction, an estimated gradient value G is calculated based on an output signal of the acceleration sensor without using output signals of the wheel speed sensors. Accordingly, when, for example, the wheel speed sensors are single-function sensors which cannot detect a rotating direction of wheels, an erroneous estimation of the estimated gradient value due to an erroneous determination of a travel direction of the vehicle can be suppressed. With the operation, an advantage can be obtained in that an estimated accuracy of the estimated gradient value can be improved while employing the single-function wheel speed sensors.

BRIEF DESCRIPTION OF DRAWINGS

FIG. 13 is an explanatory view showing an operation of the vehicle control system described in FIG. 1.

FIG. 14 is an explanatory view showing an operation of the vehicle control system described in FIG. 1.

FIG. 20 is an explanatory view showing the example of the vehicle control system described in FIG. 19.

DESCRIPTION OF EMBODIMENT

Figure 1:
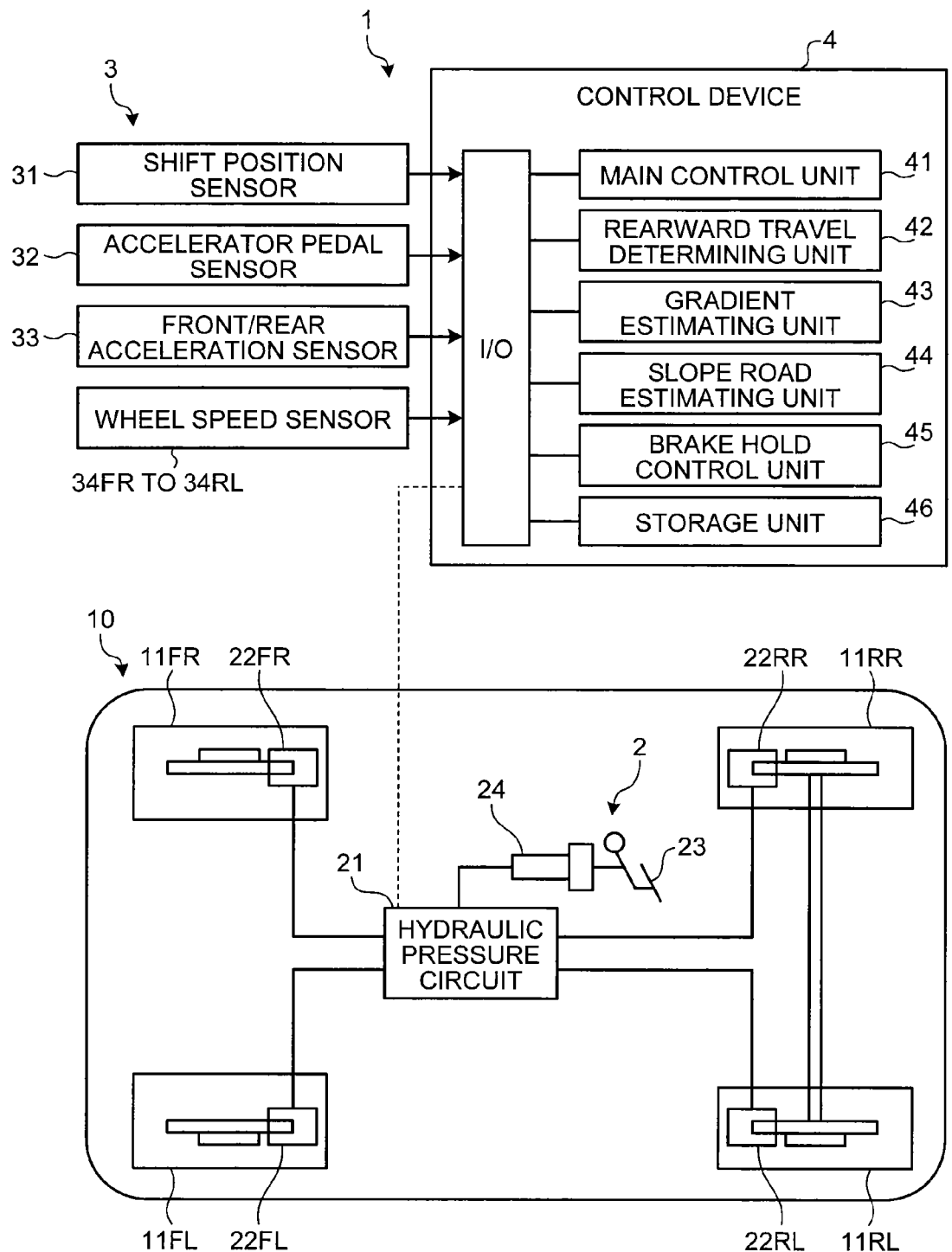
FIG. 1 is a configuration view showing a vehicle control system according to an embodiment of the present invention.

The present invention will be explained below in detail referring to the drawings. Note that the present invention is by no means limited by the embodiment. Further, the components of the embodiment include components which can be easily replaced while keeping uniformity as well as whose replacement is obvious. Further, plural modifications described in the embodiment can be optionally combined within a scope which is obvious to a person skilled in the art.

Vehicle Control System

FIG. 1 is a configuration view showing a vehicle control system according to an embodiment of the present invention. A vehicle control system 1 is a system for controlling a vehicle based on an estimated gradient value of a travel road and in particular can realize a brake hold control.

The brake hold control is a control for keeping a stop state of the vehicle by holding a brake force of wheels under a predetermined condition when the vehicle stops. In the brake hold control, the stop state of the vehicle can be kept without the need for a driver to depress a brake pedal and further the vehicle can be started only by depressing an accelerator pedal while, for example, the vehicle travels on a slope road or in a traffic jam. As a result, a burden of a brake pedal operation of the driver is reduced.

The vehicle control system 1 includes a brake force control device 2, a sensor unit 3, and a control device 4.

Note that, in the embodiment, a vehicle 10 employs a FR (Front engine Rear drive) type, a left side rear wheel 11RL and a right side rear wheel 11RR of the vehicle 10 are driving wheels of the vehicle 10, and a left side front wheel 11FL and a right side front wheel 11FR are steered wheels of the vehicle 10.

The brake force control device 2 is a device for controlling brake forces to the respective wheels 11FR to 11RL, and has a hydraulic pressure circuit 21, wheel cylinders 22FR to 22RL, a brake pedal 23, and a master cylinder 24. The hydraulic pressure circuit 21 is composed of a reservoir, an oil pump, a hydraulic pressure holding valve, a hydraulic pressure reducing valve, and the like (not shown). The brake force control device 2 applies brake forces to the wheels 11FR to 11RL as described below. That is, (1) at the time of ordinary drive, when the brake pedal 23 is depressed by the driver, the depression amount of the brake pedal 23 is transmitted to the hydraulic pressure circuit 21 via the master cylinder 24. Thus, the hydraulic pressure circuit 21 adjusts the hydraulic pressures of the wheel cylinders 22FR to 22RL in response to the depression amount of the brake pedal 23. With the operation, the respective wheel cylinders 22FR to 22RL are driven and brake forces (brake pressures) are applied to the respective wheels 11FR to 11RL. In contrast, (2) at the time of brake force control, target brake forces to the respective wheels 11FR to 11RL are calculated based on vehicle state amounts, the hydraulic pressure circuit 21 is driven based on the target brake forces, and the brake forces of the respective wheel cylinders 22FR to 22RL are controlled.

The sensor unit 3 is a sensor group for obtaining the vehicle state amounts. The sensor unit 3 has, for example, a shift position sensor 31 for detecting a shift position of a shift device (not shown), an accelerator pedal sensor 32 for detecting ON/OFF of a depression of an accelerator pedal (not shown), a front/rear acceleration sensor 33 for detecting a front/rear acceleration gx of the vehicle, and wheel speed sensors 34FR to 34RL for detecting wheel speeds Vw of the respective wheels 11FR to 11RL.

The control device 4 is a device for controlling an operation of the vehicle control system 1 and is composed of, for example, an ECU (Electrical Control Unit). The control device 4 has a main control unit 41 for integrally controlling an operation of the control device 4, a rearward travel determining unit 42 for determining a rearward travel of the vehicle, a gradient estimating unit 43 for realizing a gradient estimating process to be described later, a slope road estimating unit 44 for realizing a slope road estimating process to be described later, a brake hold control unit 45 for realizing a brake hold control, and a storage unit 46 for storing various types of control programs, a control map, threshold values, and the like. The control device 4 controls the brake force control device 2 based on output signals of the sensor unit 3. With the operation, the brake force control is executed and various functions of the vehicle 10 are realized.

Brake Hold Control Using Single-Function Wheel Speed Sensor

FIGS. 2 to 18 are flowcharts (FIGS. 2 to 12) and explanatory views (FIGS. 13 to 18) showing the operations of the vehicle control system described in FIG. 1. These views show flowcharts and explanatory views of the brake hold control using a single-function wheel speed sensor.

In an ordinary brake hold control, an estimated gradient value of a travel road is estimated, and a brake force control of wheels is executed based on the estimated gradient value. Accordingly, in the vehicle control system, there is a problem for improving an estimated accuracy of the estimated gradient value.

In contrast, recently, to reduce the cost of a product, it is requested to employ a single-function wheel speed sensor. The single-function wheel speed sensor detects only the absolute value of a wheel speed and cannot detect a rotating direction of a wheel.

Thus, the vehicle control system 1 executes the brake hold control as described below to improve the estimated accuracy of the estimated gradient value by a configuration in which the single-function wheel speed sensor is employed (refer to FIG. 2).

At step ST1, the gradient estimating process is executed. In the gradient estimating process, a road surface gradient θ [deg] of a travel road is estimated (refer to FIG. 13). Specifically, as an estimated value of the road surface gradient θ, an estimated gradient value G [m/s^2] is used for the purpose of convenience. The estimated gradient value G has a relation of an expression (1) described below to the road surface gradient θ [deg]. Note that g shows a gravity acceleration.

$$\theta = \arcsin(G/g) \quad (1)$$

Specifically, the gradient estimating process (step ST1) is executed as described below, and the estimated gradient value G is calculated (refer to FIG. 3).

At step ST11, whether or not a travel direction of the vehicle 10 is a rearward travel side is determined. At step ST11, when an affirmative determination is made, a process goes to step ST14, whereas when a negative determination is made, the process goes to step ST12.

Here, in the vehicle control system 1, single-function sensors for detecting and outputting only the absolute values of the wheel speeds Vw are employed as the wheel speed sensors 34FR to 34RL. Accordingly, rotating directions of the wheels 11FR to 11RL cannot be detected only by output signals of the wheel speed sensors 34FR to 34RL. Thus, the control device 4 estimates that the travel direction of the vehicle 10 is the rearward travel side when any one of the following (a) to (d) is established and makes the affirmative determination.

That is, (a) when the shift position is in "an R range (rearward stage)", the vehicle speed Vv at a previous sampling time was Vv=0 [m/s] as well as the vehicle body speed Vv at a present sampling time is Vv≠0 [m/s], it is estimated that the vehicle 10 is traveling rearward. Further, (b) when an estimated slope road value S calculated at the previous sampling time was "a steep ascending road" or "an ascending road", a depression of the accelerator pedal is OFF, and vehicle body speed Vv was Vv=0 [m/s] at the previous sampling time as well as the vehicle body speed Vv is Vv≠0 [m/s] at the present sampling time, it is estimated that the vehicle 10 is traveling rearward. Further, (c) when the estimated slope road value S calculated at the previous sampling time was "a steep ascending road" or "an ascending road", the shift position is in "an N range (neutral)", and vehicle body speed Vv was Vv=0 [m/s] at the previous sampling time, as well as vehicle body speed Vv is Vv≠0 [m/s] at the present sampling time, it is estimated that the vehicle 10 is traveling rearward. Further, (d) when the estimated slope road value S calculated at the previous sampling time was "a steep ascending road" or "an ascending road", the shift position is in "a D range (forward stage)", and vehicle body speed Vv was Vv=0 [m/s] at the previous sampling time as well as vehicle body speed Vv is Vv≠0 [m/s] at the present sampling time, ≠it is estimated that the vehicle 10 is traveling rearward.

In contrast, when any of (a) to (d) described above is not established as well as (e) or (f) described below is established, it is estimated that the vehicle 10 is traveling forward and the negative determination is made. That is, (e) when a vehicle stop flag is ON in a vehicle stop determination at the previous sampling time (step ST3 to be described later) as well as the vehicle stop flag is OFF in a vehicle stop determination at the present sampling time, it is estimated that the vehicle 10 is traveling forward. Further, (f) when the shift position is in "the D range (forward traveling stage)", the depression of the accelerator pedal is ON as well as vehicle body speed Vv is Vv≠0 [m/s] at the present sampling time, it is estimated that the vehicle 10 is traveling forward.

According to the determination references, when the shift position is in "the D range" or in "the N range" at the time the vehicle 10 stops, the determination whether or not the vehicle 10 is traveling rearward is also appropriately made (refer to FIG. 14). As a case, for example, that, when the vehicle 10 starts in "the D range" and stops, an actual travel direction of the vehicle 10 is the rearward travel side, there is assumed a case that the vehicle 10 gradually travels rearward on an ascending road. In the case, it is determined by the determination reference (b) that the vehicle 10 is traveling rearward. Further, in a case that, when the vehicle 10 starts in "the R range" and stops, the actual travel direction of the vehicle 10 is the rearward travel side, it is determined that the vehicle 10 is traveling rearward in any of a flat road, a descending road, and the ascending road by the determination reference (a).

Note that in the embodiment, the control device 4 determines ON/OFF of the depression of the accelerator pedal based on an output signal of the accelerator pedal sensor 32 and further determines the shift position based on an output signal of the shift position sensor 31. Further, the control device 4 estimates the vehicle body speed Vv based on output signals of wheel speed sensors 34RR, 34RL of the two wheels (driving wheels 11RR, 11RL) of the four wheels 11FR to 11RL and determines whether or not Vv=0 [m/s] by the vehicle body speed Vv. Note that the slope road estimating process for calculating the estimated slope road value S (step ST2) and the vehicle stop determination for determining a vehicle stop (step ST3) will be described later.

At step ST12, the estimated gradient value G at the time the vehicle travels forward (negative determination at step ST11) is calculated. The estimated gradient value G at the time the vehicle travels forward is calculated as G=gx to dVw/dt. That is, the output signal gx of the front/rear acceleration sensor 33 is corrected by a wheel acceleration dVw/dt, and the estimated gradient value G is calculated. Note that in the embodiment, the control device 4 calculates the wheel acceleration dVw/dt based on the output signals of the wheel speed sensors 34RR, 34RL of the two wheels (driving wheels 11RR, 11RL) of the four wheels 11FR to 11RL. After step ST12, the process goes to step ST13.

At step ST13, a change rate guard process is executed. The change rate guard process is a process for removing a pitching vibration component of the vehicle 10 from the estimated gradient value G. Specifically, the pitching vibration component of a predetermined range is removed using the output signal of the front/rear acceleration sensor 33 at the previous sampling time as a reference. After step ST13, the process goes to step ST15.

At step ST14, the estimated gradient value G at the time the vehicle travels rearward (affirmative determination at step ST11) is calculated. The estimated gradient value G at the time the vehicle travels rearward is calculated as G=gx. That is, the estimated gradient value G is calculated by using only the output signal gx of the front/rear acceleration sensor 33 and a correction by the wheel acceleration dVw/dt is not made. After step ST14, the process goes to step ST15.

At step ST15, a filter process is executed. The filter process is a low-pass filter process, and the process is executed at a predetermined cut off frequency using a secondary Butterworth filter. After step ST15, the process goes to step ST2.

Figure 3:
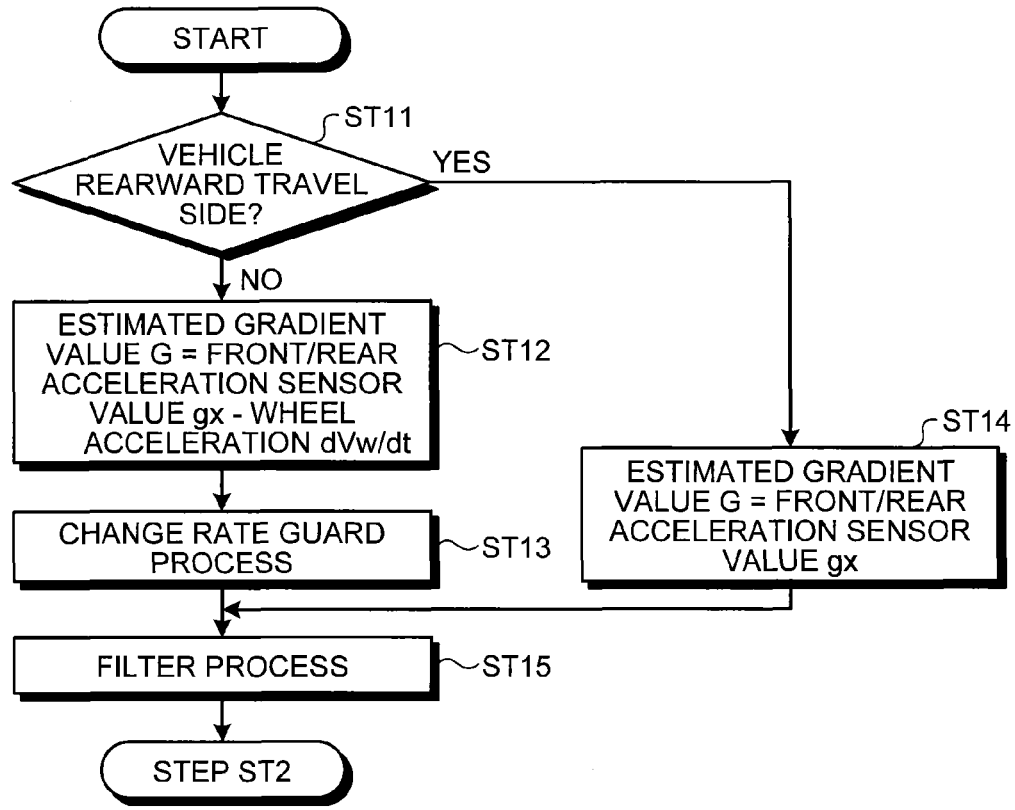
FIG. 3 is a flowchart showing an operation of the vehicle control system described in FIG. 1.

As described above, in the gradient estimating process (step ST1), while the vehicle is traveling forward, the correction by the wheel acceleration dVw/dt is made to the output signal gx of the front/rear acceleration sensor 33, and the estimated gradient value G is calculated (negative determination at steps ST11 and ST12) (refer to FIG. 3). With the operation, the influence of the vibration component of the vehicle is reduced and an estimated accuracy of the estimated gradient value G is improved.

In contrast, while the vehicle is traveling rearward, the estimated gradient value G is calculated using only the output signal gx of the front/rear acceleration sensor 33 (affirmative determination at steps ST11 and ST14) (refer to FIG. 3). In the configuration, when the wheel speed sensors 34FR to 34RL are the single-function sensors which cannot detect a rotating direction of the wheels 11FR to 11RL, an erroneous estimation of the estimated gradient value G can be suppressed. That is, in the single-function wheel speed sensors, when a travel direction of the vehicle is erroneously determined at the time the estimated gradient value G is corrected using the wheel acceleration dVw/dt, the estimated gradient value G may be erroneously estimated. Accordingly, the erroneous estimation of the estimated gradient value G can be suppressed by calculating the estimated gradient value G using only the output signal gx of the front/rear acceleration sensor 33. Note that the estimated accuracy of the estimated gradient value G while the vehicle is traveling rearward is appropriately secured by the slope road estimating process (step ST2) and the vehicle stop determination (step ST3) to be described later.

Figure 2:
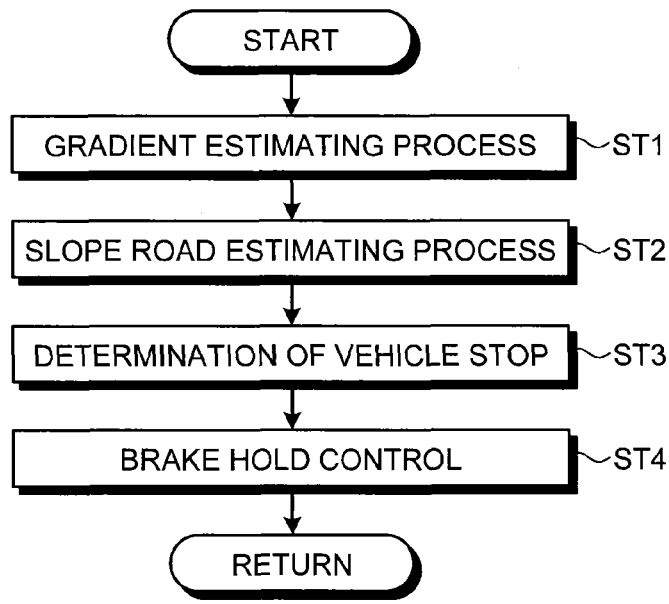
FIG. 2 is a flowchart showing an operation of the vehicle control system described in FIG. 1.

At step ST2, the slope road estimating process is executed (refer to FIG. 2). In the slope road estimating process, the estimated slope road value S corresponding to a gradient of a travel road is calculated. The estimated slope road value S has the steep ascending road, a steep descending road, the ascending road, a descending road, and the flat road. The estimated slope road value S is calculated based on the estimated gradient value G.

Figure 4:
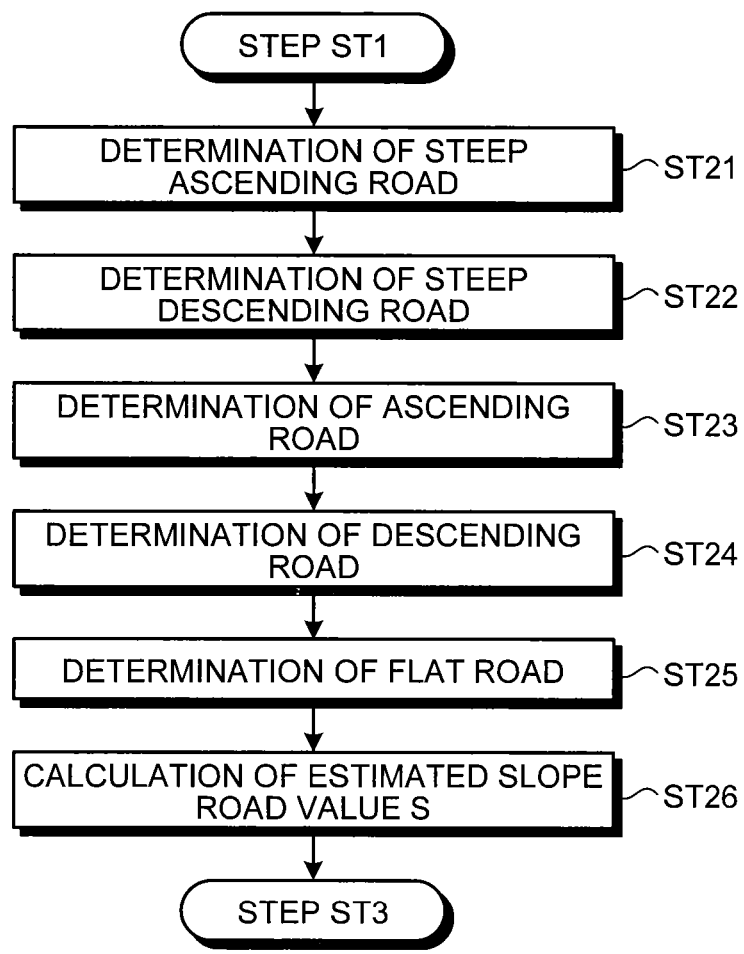
FIG. 4 is a flowchart showing an operation of the vehicle control system described in FIG. 1.

Specifically, the slope road estimating process (step ST2) is executed as described below and the estimated slope road value S is calculated (refer to FIG. 4). First, a steep ascending road determination (step ST21), a steep descending road determination (step ST22), an ascending road determination (step ST23), a descending road determination (step ST24) and a flat road determination (step ST25) are sequentially executed. Thereafter, the estimated slope road value S is calculated (step ST26) based on the results of determinations at steps ST21 to ST25.

The steep ascending road determination at step ST21 is executed as described below (refer to FIGS. 4 and 5).

At step ST2101, whether or not the vehicle 10 is traveling rearward is determined. In the determination, the result of determination at step ST11 is used. When an affirmative determination is made at step ST2101, the process goes to step ST2112, whereas when a negative determination is made, the process goes to step ST2102.

At step ST2102, whether or not the estimated gradient value G is equal to or more than a predetermined threshold value k1 (G≥k1) is determined. The estimated gradient value G is a numerical value calculated by the gradient estimating process (step ST1). Further, the threshold value k1 is a preset value showing a boundary between the steep ascending road and the ascending road (refer to FIGS. 15 and 16). Note that in the embodiment, the threshold value k1 is set using a gradient value when the road surface gradient θ becomes a predetermined value as a reference. When an affirmative determination is made at step ST2102, the process goes to step ST2103, whereas when a negative determination is made, the process goes to step ST2104.

At step ST2103, a steep ascending road pre-flag becomes ON. The steep ascending road pre-flag is a flag for pre-estimating that the travel road is the steep ascending road and used prior to a final estimation to be described later (step ST2109). After step ST2103, the process goes to step ST2106.

At step ST2104, whether or not the estimated gradient value G is less than a predetermined threshold value k1h (G<k1h) is determined. The threshold value k1h is a rated value for determining whether or not the ON state of the steep ascending road pre-flag is kept when the steep ascending road pre-flag is ON (affirmative determination at steps ST2102 and ST2103). Further, the threshold value k1h is smaller than the threshold value k1 at step ST2102 and larger than a threshold value k2 to be described later. Note that, in the embodiment, the threshold value k1 is set using a gradient value when the road surface gradient θ becomes a predetermined value as a reference. When an affirmative determination is made at step ST2104, the process goes to step ST2105, whereas when a negative determination is made, the process goes to step ST2106.

At step ST2105, the steep ascending road pre-flag becomes OFF. After step ST2105, the process goes to step ST2106.

At step ST2106, whether or not the steep ascending road pre-flag is ON is determined. When an affirmative determination is made at step ST2106, the process goes to step ST2107, whereas when a negative determination is made, the process goes to step ST2110.

At step ST2107, a time T1 of a timer is incremented. Note that, in the embodiment, the control device 4 has an internal timer (not shown), and the time T1 is counted by the timer. After step ST2107, the process goes to step ST2108.

At step ST2108, whether or not the time T1 of the timer has exceeded a predetermined set time Ts (T1>Ts) is determined. Note that, in the embodiment, the set time Ts is set to a predetermined value. When an affirmative determination is made at step ST2108, the process goes to step ST2109, whereas when a negative determination is made, the process goes to step ST22.

At step ST2109, a steep ascending road flag becomes ON. The steep ascending road flag is a flag for finally estimating that the travel road is the steep ascending road and is used to calculate the estimated slope road value S to be described later (step ST26). After step ST2109, the process goes to step ST22.

At step ST2110, the time T1 of the timer is reset (T1=0). After step ST2110, the process goes to step ST2111.

At step ST2111, the steep ascending road flag becomes OFF. After step ST2111, the process goes to step ST22.

At step ST2112, whether or not the vehicle stops is determined. In the determination, the result of determination of the vehicle stop determination to be described later (step ST3) is used. Specifically, when a vehicle stop flag is ON, an affirmative determination is made (step ST35). When the affirmative determination is made at step ST2112, the process goes to step ST22, whereas when a negative determination is made, the process goes to step ST2113.

At step ST2113, whether or not the estimated gradient value G is equal to or more than the predetermined threshold value k1 (G≥k1) is determined. The determination is made likewise the determination at step ST2102. When an affirmative determination is made at step ST2113, the process goes to step ST2114, whereas when a negative determination is made, the process goes to step ST2115.

At step ST2114, the steep ascending road flag becomes ON. After step ST2114, the process goes to step ST22.

At step ST2115, the steep ascending road flag becomes OFF. After step ST2115, the process goes to step ST22.

Figure 5:
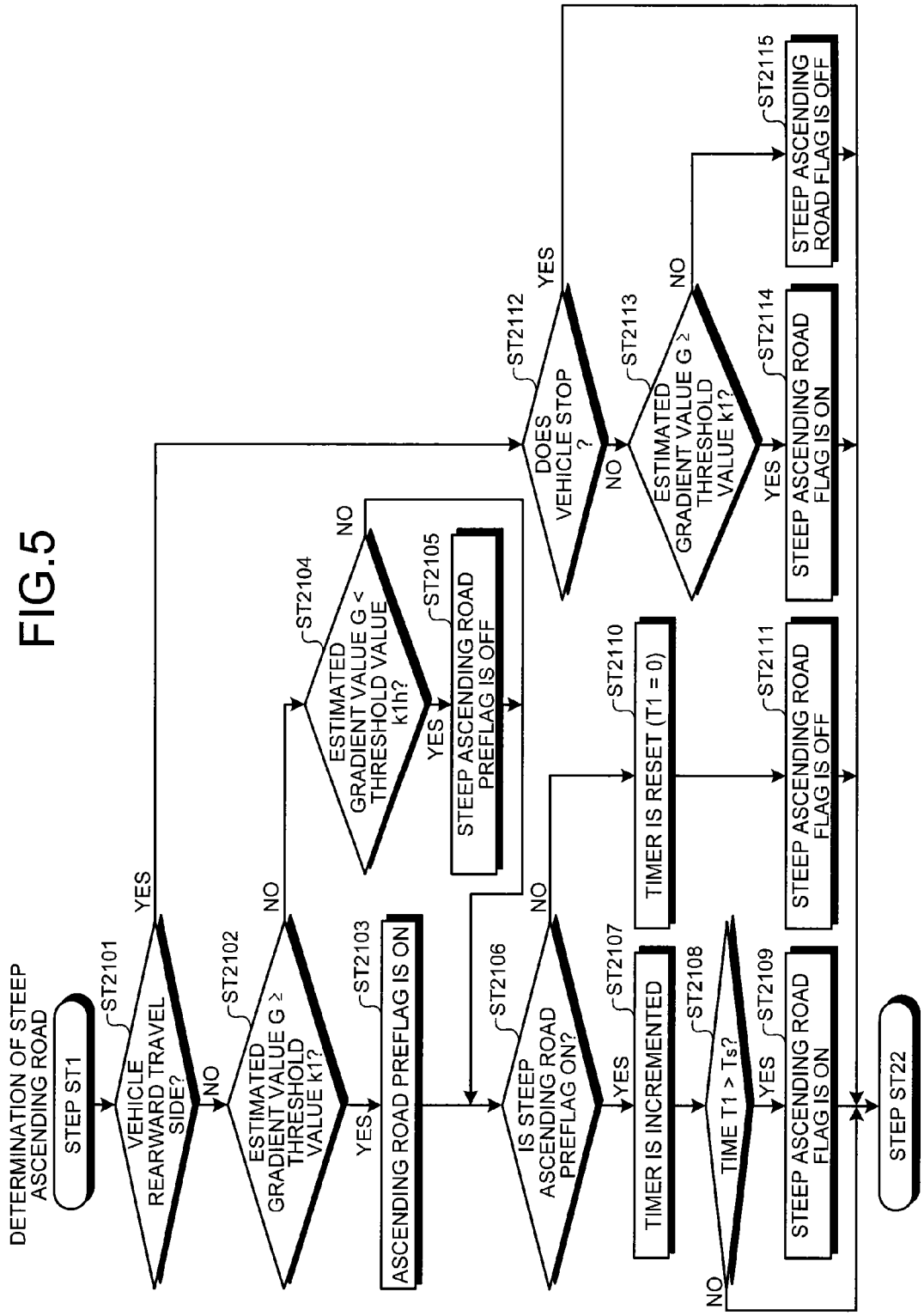
FIG. 5 is a flowchart showing an operation of the vehicle control system described in FIG. 1.

As described above, in the steep ascending road determination (step ST21), while the vehicle is traveling forward, first, the steep ascending road is pre-estimated, and after the predetermined time Ts has passed, the steep ascending road is finally estimated (negative determination at steps ST2101 and ST2102 to ST2109) (refer to FIG. 5). With the operation, since an erroneous determination due to a temporary vibration at the time the vehicle travels is suppressed, a determination accuracy of the steep ascending road determination is improved.

In contrast, while the vehicle is traveling rearward, a pre-estimation of the steep ascending road is omitted (steps ST2103 to ST2106) (refer to FIG. 5). Accordingly, when the estimated gradient value G is G≥k1, the steep ascending road flag becomes ON at once, and a final estimation of the steep ascending road is established (affirmative determination at steps ST2113 and ST2114). This is because of the following reason. That is, while the vehicle is traveling rearward, the estimated gradient value G is calculated using only the output signal gx of the front/rear acceleration sensor 33 (affirmative determination at steps ST11 and ST14) (refer to FIG. 3). Accordingly, since the correction by the wheel acceleration dVw/dt is not made, the estimated gradient value G is liable to receive the influence of vibration when the vehicle stops.

Accordingly, when it is intended to execute the final estimation after the predetermined time Ts has passed from the pre-estimation as in the case that the vehicle travels forward, the steep ascending road pre-flag becomes ON in the pre-estimation before the vehicle stops, and thus when the vehicle stops before the steep ascending road flag becomes ON, there is a possibility that an erroneous determination reflecting the result of the previous pre-estimation may be made in the subsequent final estimation. Thus, the determination accuracy of the steep ascending road determination is improved by executing the final estimation at once omitting the pre-estimation while the vehicle is traveling rearward. Note that the influence of vibration when the vehicle stops is eased by setting a determination waiting time Tw (step ST32) in the vehicle stop determination to be described later (step ST3).

Figures 15, 16:
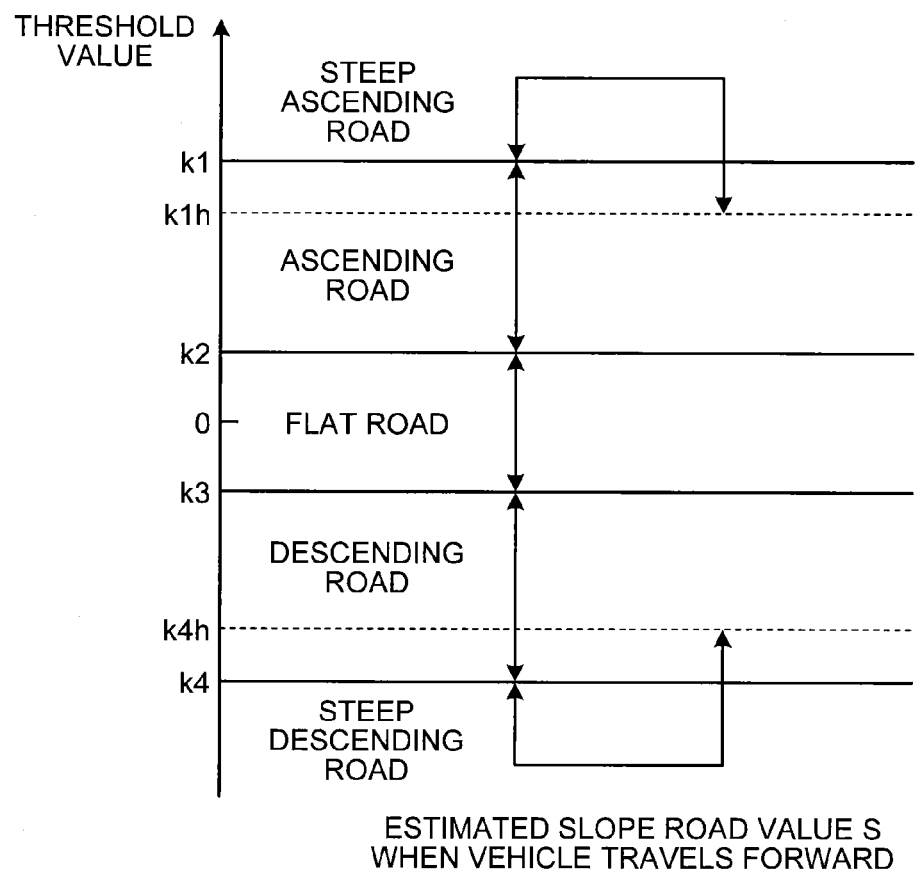
FIG. 15 is an explanatory view showing an operation of the vehicle control system described in FIG. 1.
FIG. 16 is an explanatory view showing an operation of the vehicle control system described in FIG. 1.

Further, while the vehicle is traveling forward, a hysteresis is provided with an estimating condition of the steep ascending road (negative determination at steps ST2101 and ST2102 to ST2105) (refer to FIGS. 5 and 16). That is, the estimated gradient value G may vibrate beyond the threshold value k1 of pre-estimation of the steep ascending road depending on the road surface gradient θ at a vehicle stop position. Thus, a difference is made between the threshold value k1 for making the steep ascending road pre-flag ON and the threshold value k1$h$ for making the steep ascending road pre-flag OFF. Further, these threshold values k1, k1$h$ have the relation of k1>k1$h$. Accordingly, when the steep ascending road pre-flag becomes ON, the ON state of the steep ascending road pre-flag is kept until the estimated gradient value G becomes less than the threshold value k1$h$. With the operation, since the hysteresis is formed to the estimating condition of the steep ascending road, the influence of vibration when the vehicle stops is reduced.

In contrast, while the vehicle is traveling rearward, the hysteresis in the slope road estimating process (steps ST2102 to ST2105) is omitted, and the steep ascending road flag is made to ON/OFF using the same threshold value k1 (affirmative determination at steps ST2101 and ST2112 to ST2115). This is because of the following reason. That is, while the vehicle is traveling rearward, since the estimated gradient value G is calculated using only the output signal gx of the front/rear acceleration sensor 33 (affirmative determination at steps ST11 and ST14) (refer to FIG. 3), the estimated gradient value G is liable to receive the influence of vibration when the vehicle stops. Accordingly, when the hysteresis is provided with ON/OFF of the steep ascending road pre-flag, both the steep ascending road flag and an ascending road flag to be described later become ON frequently. Thus, while the vehicle is traveling rearward, the steep ascending road flag is made to ON/OFF using the same threshold value k1 so that only one of the steep ascending road flag and the ascending road flag becomes ON. Note that the influence of vibration when the vehicle stops is eased by setting the determination waiting time Tw (step ST32) in the vehicle stop determination (step ST3) to be described later.

The steep descending road determination at step ST22 is executed as described below (refer to FIGS. 4 and 6).

First, at step ST2201, whether or not the vehicle 10 is traveling rearward is determined. When a negative determination is made at step ST2201, a pre-estimating process (steps ST2202 to ST2205) and a final estimating process (steps ST2206 to ST2211) of the steep descending road are executed. In contrast, when an affirmative determination is made, the estimating process (steps ST2212 to ST2215) of the steep descending road is executed omitting the pre-estimating process. Since these processes are the same as the respective processes (steps ST2102 to ST2105, ST2106 to ST2111, and ST2112 to ST2115) in the steep ascending road determination (step ST21), an explanation thereof will not be repeated.

Figure 6:
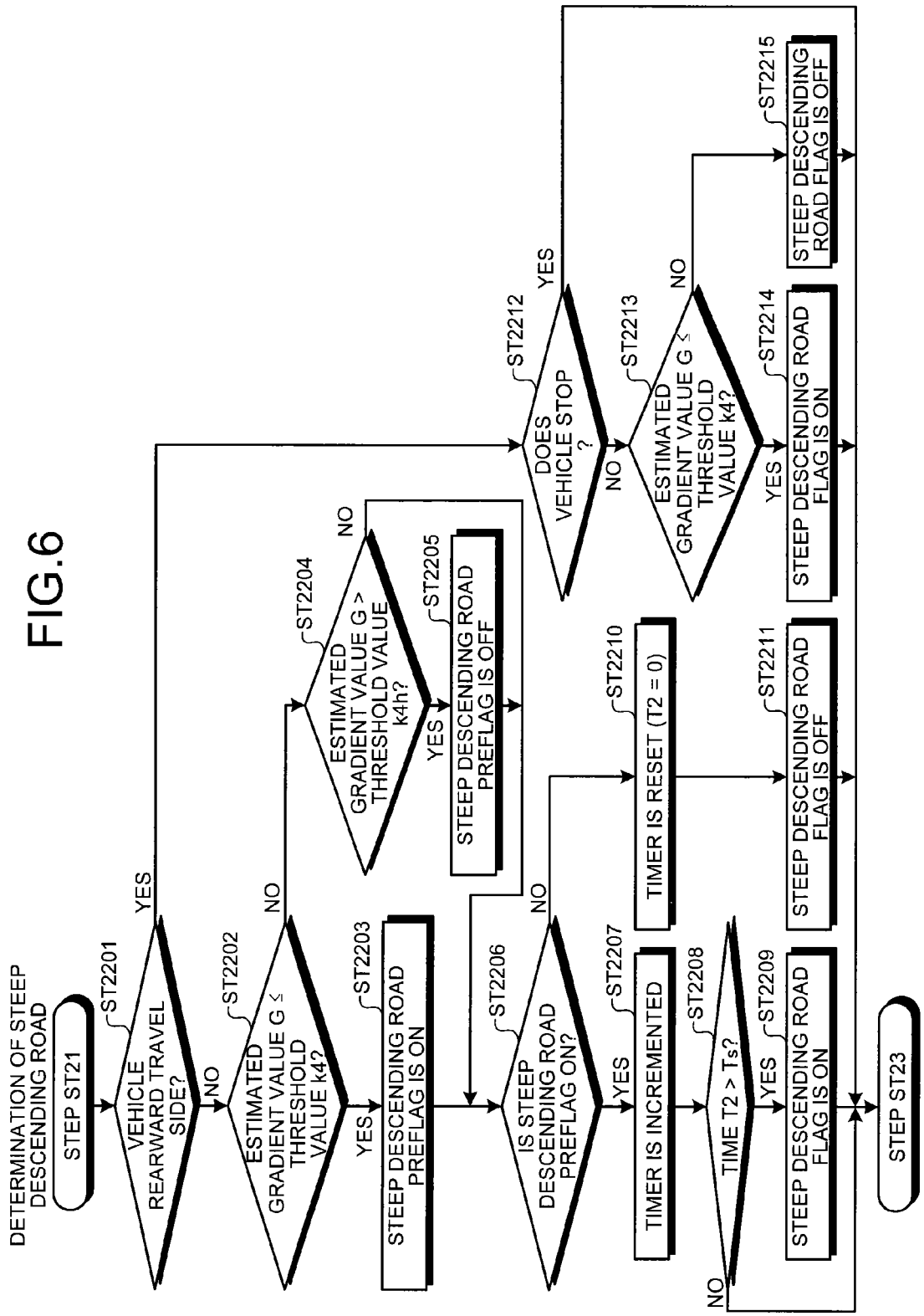
FIG. 6 is a flowchart showing an operation of the vehicle control system described in FIG. 1.

Note that, in the pre-estimating process of the steep descending road (steps ST2202 to ST2205), threshold values k4, k4$h$ for the steep descending road are used, respectively in place of the threshold value k1 of the estimated gradient value G and the threshold value k1$h$ of the hysteresis (refer to FIGS. 6, 15, and 16). Further, a determining condition at step ST2202 becomes G≤k4, and the determining condition at step ST2204 becomes G>k4$h$. They depend on a difference between the steep ascending road and the steep descending road. Note that, in the embodiment, the threshold value k4 is set using a gradient value when the road surface gradient θ becomes the predetermined value as the reference. Further, the threshold value k4$h$ is set using the gradient value when the road surface gradient θ becomes the predetermined value as the reference.

An ascending road determination at step ST23 is executed as described below (refer to FIGS. 4 and 7).

At Step ST2301, whether or not the vehicle stops is determined. The determination is made based on the result of the vehicle stop determination to be described later (step ST3). Specifically, when the vehicle stop flag is ON (step ST35), an affirmative determination is made. When the affirmative determination is made at step ST2301, the process goes to step ST24, whereas when a negative determination is made, the process goes to step ST2302.

At step ST2302, whether or not the estimated gradient value G is equal to or more than the predetermined threshold value k2 (G≥k2). The threshold value k2 is a preset value showing a boundary between the ascending road and the flat road (refer to FIGS. 15 and 16). Note that, in the embodiment, the threshold value k2 is set using the gradient value when the road surface gradient θ becomes the predetermined value as the reference. When the affirmative determination is made at step ST2302, the process goes to step ST2303, whereas when a negative determination is made, the process goes to step ST2305.

At step ST2303, whether or not the estimated gradient value G is less than the predetermined threshold value k1 (G<k1) is determined. When an affirmative determination is made at step ST2303, the process goes to step ST2304, whereas when a negative determination is made, the process goes to step ST2305.

At step ST2304, the ascending road flag becomes ON. The ascending road flag is a flag for estimating that the travel road is the ascending road and used to calculate the estimated slope road value S to be described later (step ST26). After step ST2304, the process goes to step ST24.

At step ST2305, the ascending road flag becomes OFF. After step ST2305, the process goes to step ST24.

Figure 7:
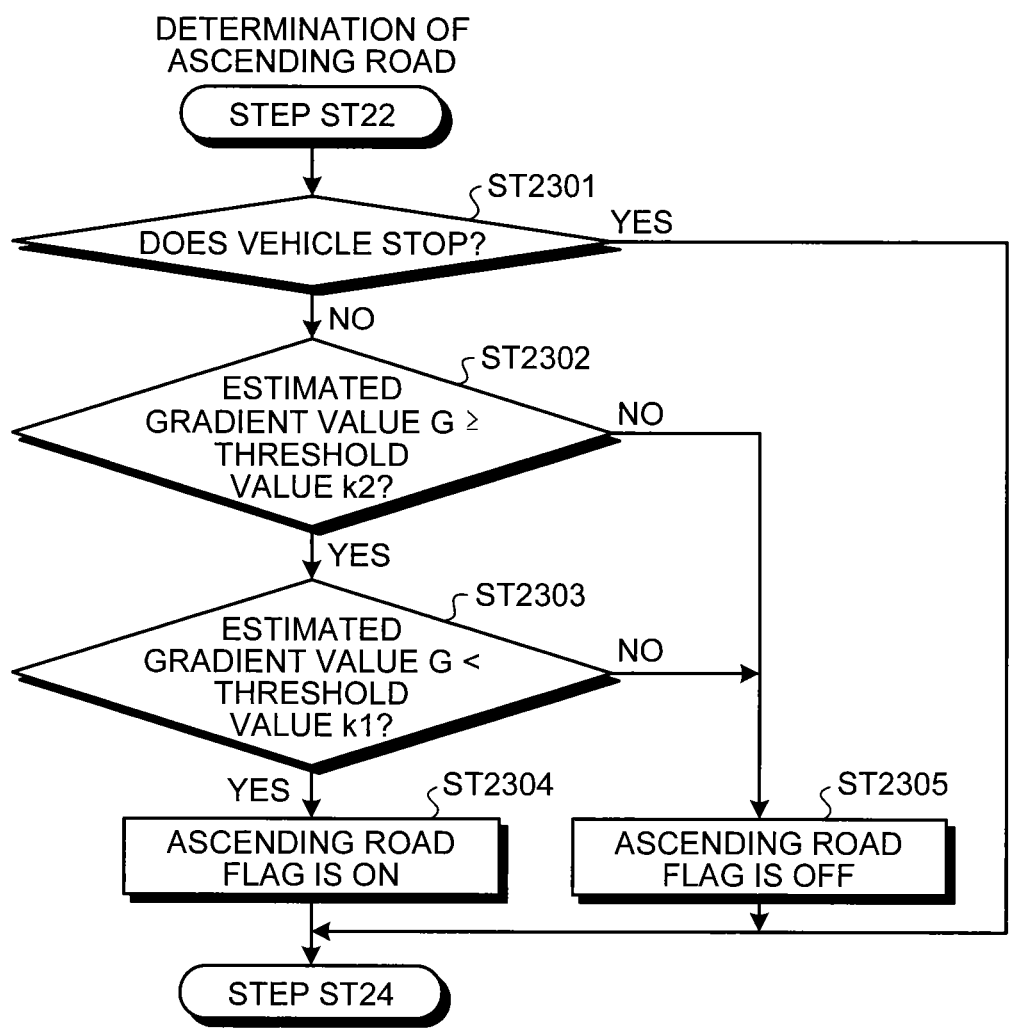
FIG. 7 is a flowchart showing an operation of the vehicle control system described in FIG. 1.

As described above, in the ascending road determination (step ST23), when the estimated gradient value G is within a range of k2≤G<k1, the ascending road flag becomes ON (refer to FIGS. 7, 15 and 16). Here, when vehicle travels forward, since the pre-estimating process of the steep ascending road is provided with the hysteresis (steps ST2102 to ST2105), both the steep ascending road flag and the ascending road flag may become ON. In the case, an adjustment is made in a calculation process of an estimated slope road to be described later (step ST26).

The descending road determination at step ST24 is executed as described below (refer to FIGS. 4 and 8).

First, at step ST2401, whether or not the vehicle stops is determined. The determination is made based on the result of the vehicle stop determination to be described later (step ST3). Specifically, when the vehicle stop flag is ON (step ST35), an affirmative determination is made. When the affirmative determination is made at step ST2401, a descending road flag becomes ON under the condition that the estimated gradient value G is within a range of k4<G≤k3 (steps ST2402 to ST2404). Since these processes are the same as the respective process (steps ST2302 to ST2305) in the ascending road determination (step ST23), an explanation thereof will not be repeated. In contrast, when a negative determination is made, the process goes to step ST2405.

Figure 8:
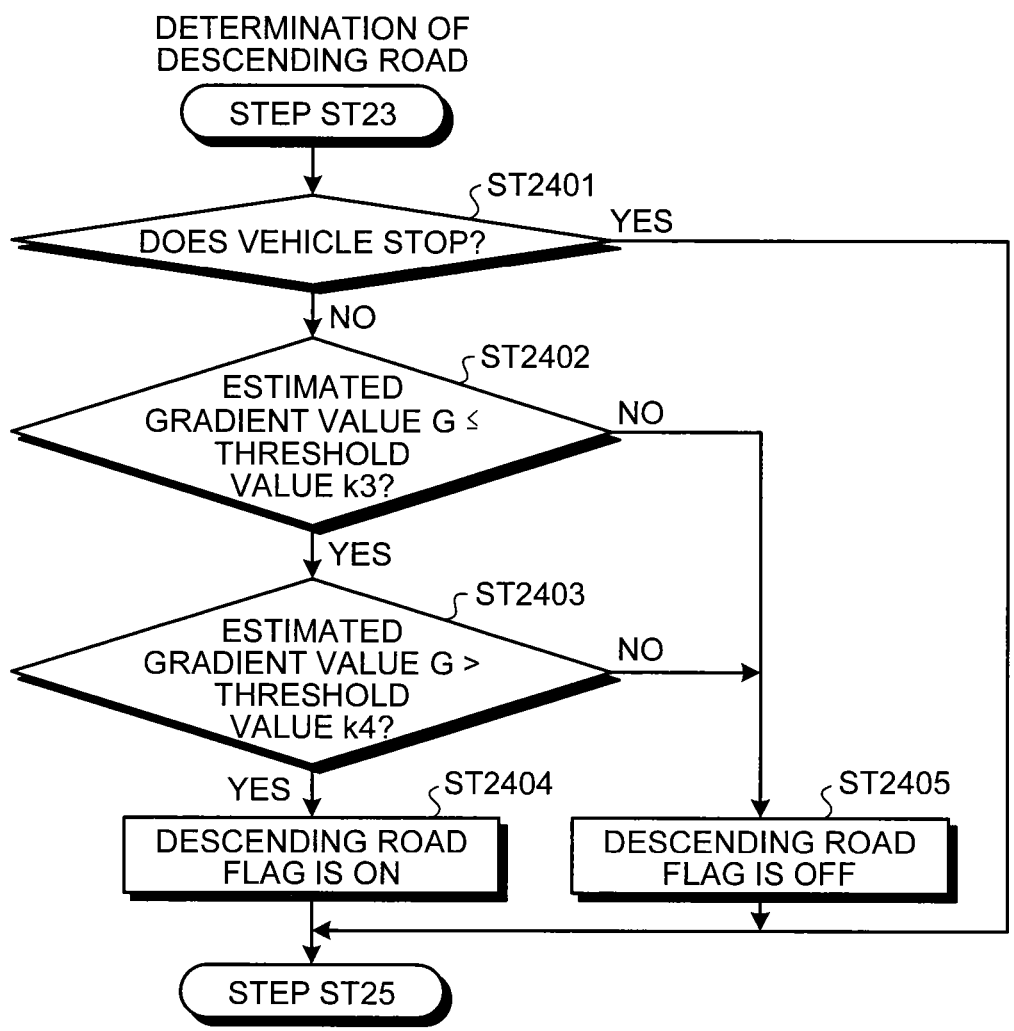
FIG. 8 is a flowchart showing an operation of the vehicle control system described in FIG. 1.

Note that, in the descending road determination (step ST24), the threshold values k3, k4 for the descending road are used in place of the threshold values k1, k2 for the ascending road (refer to FIGS. 8, 15 and 16). Further, the determining condition at step ST2402 becomes G≥k3, and the determining condition at step ST2203 becomes G>k4. They depend on the difference between the ascending road and the descending road. Note that, in the embodiment, the threshold value k3 is set using the gradient value when the road surface gradient θ becomes the predetermined value as the reference.

Further, in the descending road determination (step ST24), when the estimated gradient value G is within a range of k4<G≤k3, the descending road flag becomes ON (refer to FIGS. 8, 15 and 16). Here, when the vehicle travels forward, since the pre-estimating process of the steep descending road (steps ST2202 to ST2205) is provided with the hysteresis, both the steep descending road flag and the descending road flag may become ON. In the case, the adjustment is made in the calculation process of the estimated slope road to be described later (step ST26).

Figure 9:
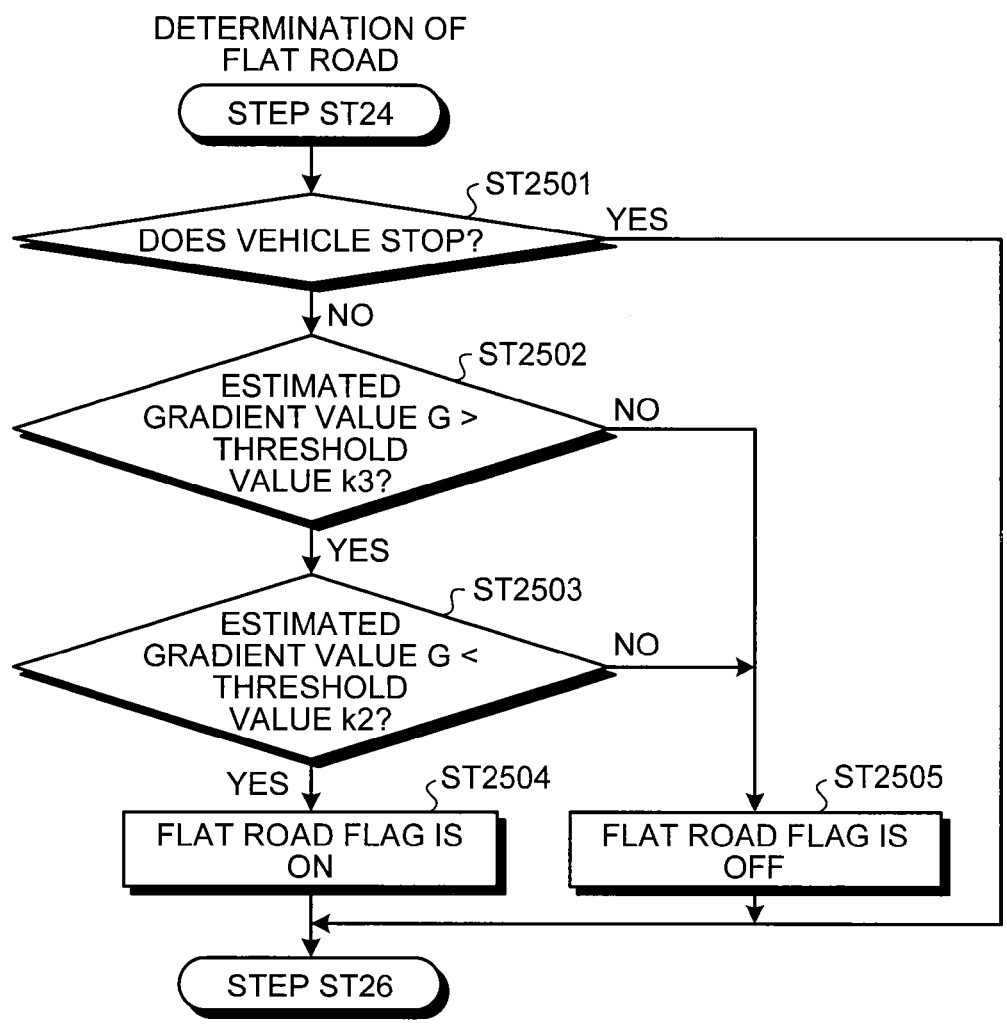
FIG. 9 is a flowchart showing an operation of the vehicle control system described in FIG. 1.

The flat road determination at step ST25 is executed as described below (refer to FIGS. 4 and 9).

At step ST2501, whether or not the vehicle stops is determined. When an affirmative determination is made at step ST2501, the process goes to step ST2502, whereas when a negative determination is made, the process goes to step ST26.

At step ST2502, whether or not the estimated gradient value G is larger than the predetermined threshold value k3 (G>k3) is determined. When an affirmative determination is made at step ST2502, the process goes to step ST2503, whereas when a negative determination is made, the process goes to step ST2505.

At step ST2503, whether or not the estimated gradient value G is less than the predetermined threshold value k2 (G<k2) is determined. When an affirmative determination is made at step ST2503, the process goes to step ST2504, whereas when a negative determination is made, the process goes to step ST2505.

At step ST2504, a flat road flag becomes ON. The flat road flag is a flag for estimating that the travel road is the flat road and is used to calculate the estimated slope road value S to be described later (step ST26). After step ST2504, the process goes to step ST26.

At step ST2505, the flat road flag is turned OFF. After step ST2505, the process goes to step ST26.

Figure 10:
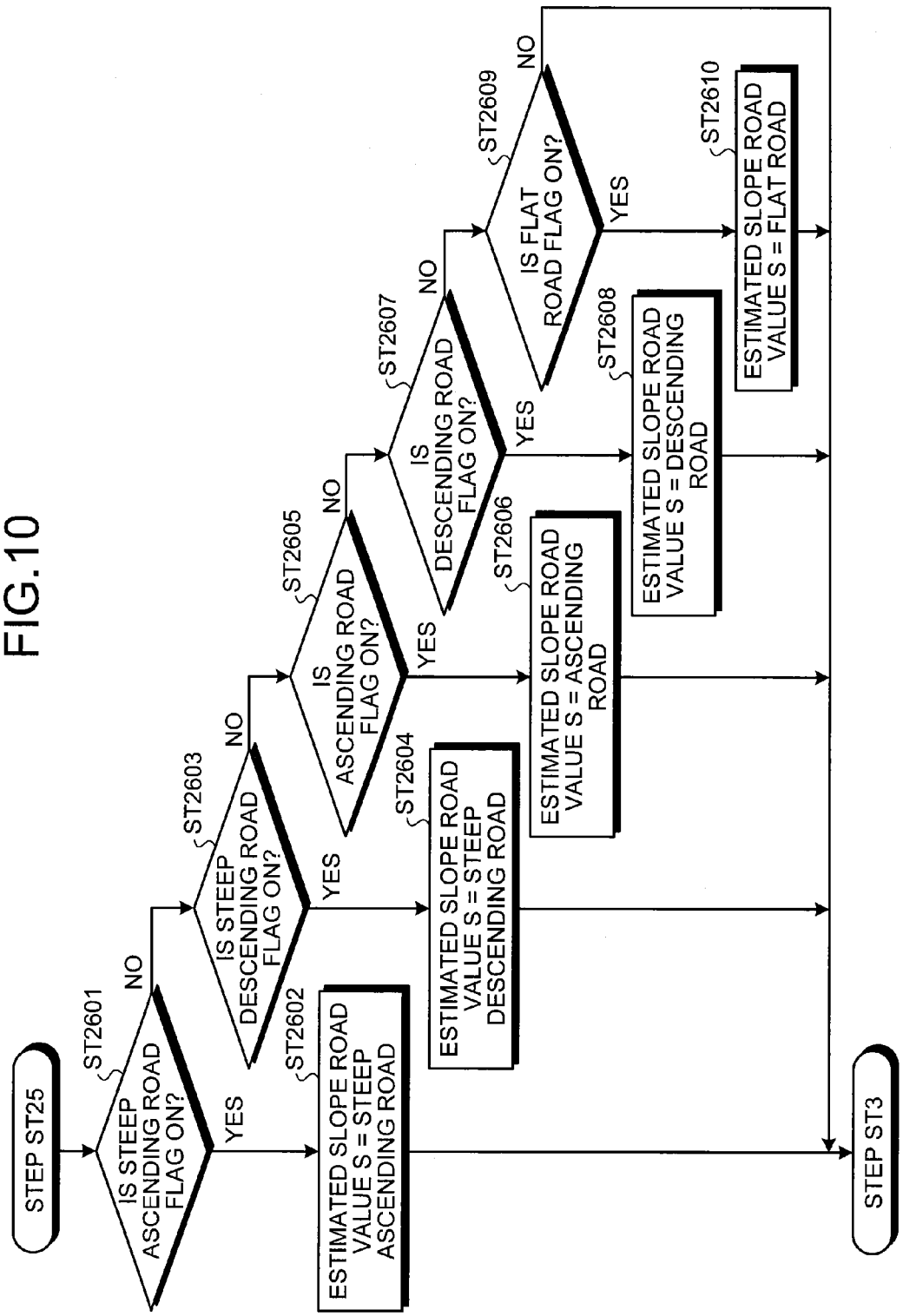
FIG. 10 is a flowchart showing an operation of the vehicle control system described in FIG. 1.

A calculation process of the estimated slope road value S at step ST26 is executed as described below (refer to FIGS. 4 and 10).

At step ST2601, whether or not the steep ascending road flag is ON is determined. In the determination, the result of the steep ascending road determination (step ST21) is used. When an affirmative determination is made at step ST2601, the process goes to step ST2602, whereas when a negative determination is made, the process goes to step ST2603.

At step ST2602, it is estimated that the estimated slope road value S is the steep ascending road. After step ST2602, the process goes to step ST3.

At step ST2603, whether or not the steep descending road flag is ON is determined. In the determination, the result of the steep descending road determination (step ST22) is used. When an affirmative determination is made at step ST2603, the process goes to step ST2604, whereas when a negative determination is made, the process goes to step ST2605.

At step ST2604, it is estimated that the estimated slope road value S is the steep descending road. After step ST2604, the process goes to step ST3.

At step ST2605, whether or not the ascending road flag is ON is determined. In the determination, the result of the ascending road determination (step ST23) is used. When an affirmative determination is made at step ST2605, the process goes to step ST2606, whereas when a negative determination is made, the process goes to step ST2607.

At step ST2606, it is estimated that the estimated slope road value S is the ascending road. After step ST2606, the process goes to step ST3.

At step ST2607, whether or not the descending road flag is ON is determined. In the determination, the result of the descending road determination (step ST24) is used. When an affirmative determination is made at step ST2607, the process goes to step ST2608, whereas when a negative determination is made, the process goes to step ST2609.

At step ST2608, it is estimated that the estimated slope road value S is the descending road. After step ST2608, the process goes to step ST3.

At step ST2609, whether or not the flat road flag is ON is determined. In the determination, the result of the flat road determination (step ST25) is used. When an affirmative determination is made at step ST2609, the process goes to step ST2610, whereas when a negative determination is made, the process goes to ST3.

At step ST2610, it is estimated that the estimated slope road value S is the flat road. After step ST2610, the process goes to step ST3.

As described above, in the calculation process of the estimated slope road value S (step ST26), the estimated slope road value S is calculated in the order of the steep ascending road flag, the steep descending road flag, the ascending road flag, the descending road flag, and the flat road flag. Accordingly, when both the steep ascending road flag and the ascending road flag are ON, the steep ascending road flag is preferentially employed, and it is estimated that the estimated slope road value S is the steep ascending road. Likewise, when both the steep descending road flag and the descending road flag are ON, it is estimated that the estimated slope road value S is the steep descending road.

As described above, both the steep ascending road flag and the ascending road flag become ON because of that, in the steep ascending road determination (step ST21), the pre-estimating process when the vehicle travels forward is provided with the hysteresis (negative determination at steps ST2101 and ST2102 to ST2105) (refer to FIG. 5). In contrast, when the vehicle travels rearward (affirmative determination at step ST2101), since the hysteresis in the slope road estimating process is omitted, only one of the steep ascending road flag and the ascending road flag becomes ON (refer to FIGS. 5, 7 and 16). With the operation, a case that both the steep ascending road flag and the ascending road flag become ON is prevented. Likewise, also when the vehicle travels rearward in the steep descending road determination (step ST22), since the hysteresis in the slope road estimating process is omitted, a case that both the steep descending road flag and the descending road flag become ON is prevented. Note that a different point between the brake hold control in the steep ascending road and the brake hold control in the ascending road and a different point between the brake hold control in the steep descending road and the brake hold control in the descending road will be described later.

At step ST3, the vehicle stop determination is made (refer to FIG. 2). In the vehicle stop determination, whether or not the vehicle 10 stops is determined based on the output signals of the wheel speed sensors 34FR to 34RL. Specifically, the vehicle stop determination is made as described below (refer to FIG. 11).

At step ST31, whether or not the output signals of the wheel speed sensors (pulses) are zero is determined. That is, when the output signals of the wheel speed sensors become zero, it is estimated that the vehicle 10 has stopped. For example, in the embodiment, when the output signals of any two wheels of the four wheels 11FR to 11RL become zero, the control device 4 makes an affirmative determination. When the affirmative determination is made at step ST31, the process goes to step ST32, whereas when a negative determination is made, the process goes to step ST36.

At step ST32, the determination waiting time Tw is set. The determination waiting time Tw is a waiting time until the vehicle stop determination is fixed after the output signals of the wheel speed sensors have become zero. Further, the determination waiting time Tw may be a fixed value or may be a variable value. For example, in the embodiment, when the vehicle stops traveling forward, the control device 4 calculates the determination waiting time Tw based on a braking acceleration of the vehicle 10 and a predetermined control map (refer to FIG. 17). At the time, since an smaller absolute value of the braking acceleration (an absolute value nearer to zero) generates a larger influence of sway back, the determination waiting time Tw is set longer. Note that whether or not the vehicle stops traveling forward is determined by, for example, the control device 4 based on the result of determination at step ST11. Further, the braking acceleration is calculated based on, for example, the output signals of the wheel speed sensors 34FR to 34RL. After step ST32, the process goes to step ST33.

Figure 17:
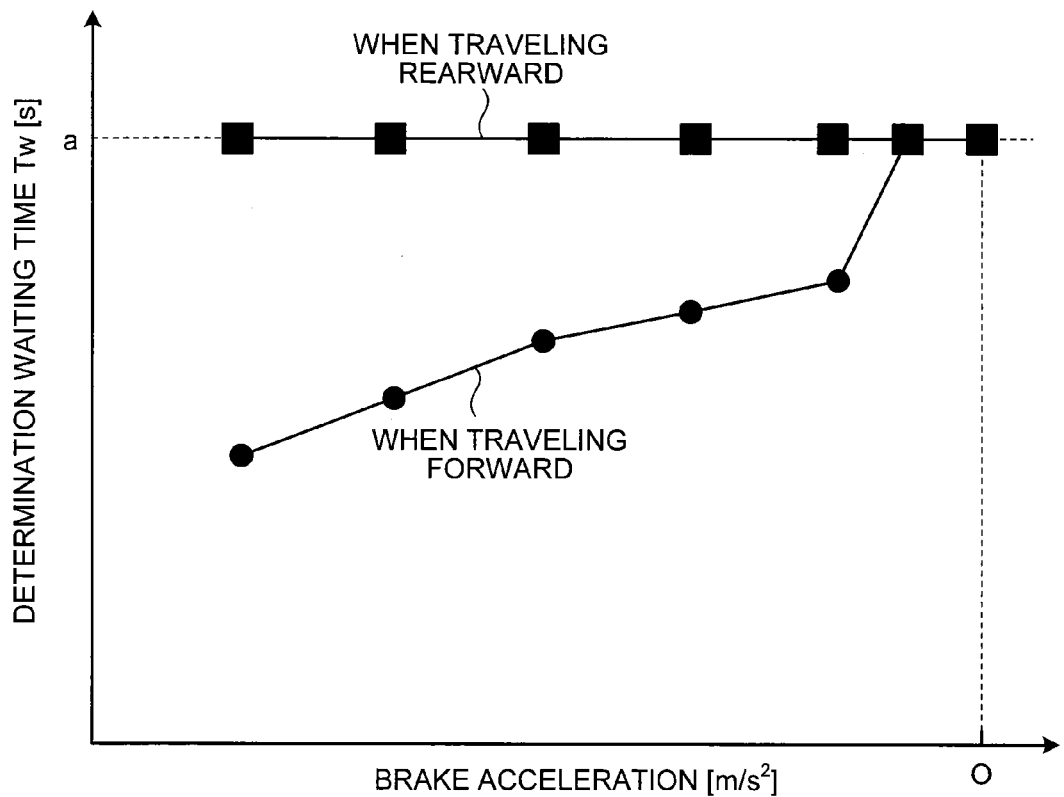
FIG. 17 is an explanatory view showing an operation of the vehicle control system described in FIG. 1.

In contrast, when the vehicle stops traveling rearward, the control device 4 sets the determination waiting time Tw to a fixed value a [sec] (refer to FIG. 17). Accordingly, the determination waiting time Tw becomes the fixed value regardless of the braking acceleration of the vehicle 10. Further, the determination waiting time Tw at the time the vehicle stops traveling rearward is set to a longest determination waiting time at the time the vehicle stops traveling forward (Tw=a [sec]).

At step ST33, a time T3 of the timer is incremented. Note that, in the embodiment, the control device 4 has an internal timer (not shown) and the time T3 is counted by the timer. After step ST33, the process goes to step ST34.

At step ST34, whether or not the time T3 of the timer has exceeded the determination waiting time Tw (T3>Tw) is determined. When an affirmative determination is made at step ST34, the process goes to step ST35, whereas when a negative determination is made, the process goes to step ST4.

At step ST35, the vehicle stop flag becomes ON. The vehicle stop flag is a flag for fixing the vehicle stop determination. Accordingly, after the determination waiting time Tw has passed after the output signals of the wheel speed sensors had become zero, the vehicle stop determination is fixed (steps ST31 to ST35). After step ST35, the process goes to step ST4.

At step ST36, the time T3 of the timer is reset (T3=0). After step ST36, the process goes to step ST37.

At step ST37, the vehicle stop flag becomes OFF. After step ST36, the process goes to step ST4.

As described above, in the vehicle stop determination (step ST3), the vehicle stop flag becomes ON after the predetermined determination waiting time Tw has passed from the time the vehicle had stopped, and the vehicle stop determination is fixed (steps ST31 to ST35). Here, before the vehicle stop determination is fixed, the gradient estimating process (step ST1) and the slope road estimating process (step ST2) are repeated, and the estimated gradient value G and the estimated slope road value S are updated (refer to FIG. 2). Accordingly, the estimated gradient value G and the estimated slope road value S become numerical values after the determination waiting time Tw has passed after the vehicle had stopped. Accordingly, since the influence of pitching vibration when the vehicle stops is reduced by that the determination waiting time Tw has passed, the estimated accuracy of the estimated gradient value G and the estimated slope road value S is improved. These estimated gradient value G and estimated slope road value S are used in the brake hold control (step ST4) to be described later.

In contrast, after the vehicle stop determination has been fixed (after step ST35), the estimated slope road value S is not updated (affirmative determination at step ST2112, affirmative determination at step ST2212, affirmative determination at step ST2301, affirmative determination at step ST2401, affirmative determination at step ST2501, and negative determination at step ST2609) (refer to FIGS. 5 to 10). Then, the brake hold control (step ST4) is executed based on the estimated slope road value S at the time the vehicle stop determination has been fixed. Accordingly, a situation that the estimated slope road value S is changed by a sway and the like after the vehicle has stopped is prevented.

Further, when the vehicle stops traveling rearward, the determination waiting time Tw until the vehicle stop determination is fixed is uniformly (constantly) set to a longest determination waiting time Tw=a (step ST32) at the time the vehicle stops traveling forward (refer to FIG. 17). This is because of the following reason. That is, when the vehicle travels rearward, the estimated gradient value G is calculated using only the output signal gx of the front/rear acceleration sensor 33, and the correction by the wheel acceleration dVw/dt is not made (step ST14) (refer to FIG. 3). Accordingly, since the determination waiting time Tw at the time the vehicle stops traveling rearward is set to the longest determination waiting time at the time the vehicle stops traveling forward, a time until a pitching vibration is attenuated when the vehicle stops can be secured. With the operation, since the output signal gx of the front/rear acceleration sensor 33 can be accurately obtained, the estimated accuracy of the estimated gradient value G and the estimated slope road value S is improved in a vehicle stop state.

At step ST4, the brake hold control is executed (refer to FIG. 2). Specifically, first, at step ST41, a control mode of the brake hold control is selected (refer to FIG. 12). Next, at step ST42, control amounts in respective control modes are determined. Next, at step ST43, the control amounts are output. Thereafter, the process returns to step ST1. Note that in the embodiment, the control device 4 executes the brake hold control based on the vehicle state amounts such as the results of calculation of the estimated gradient value G and the estimated slope road value S, ON/OFF of the accelerator pedal, and the like.

Figure 18:
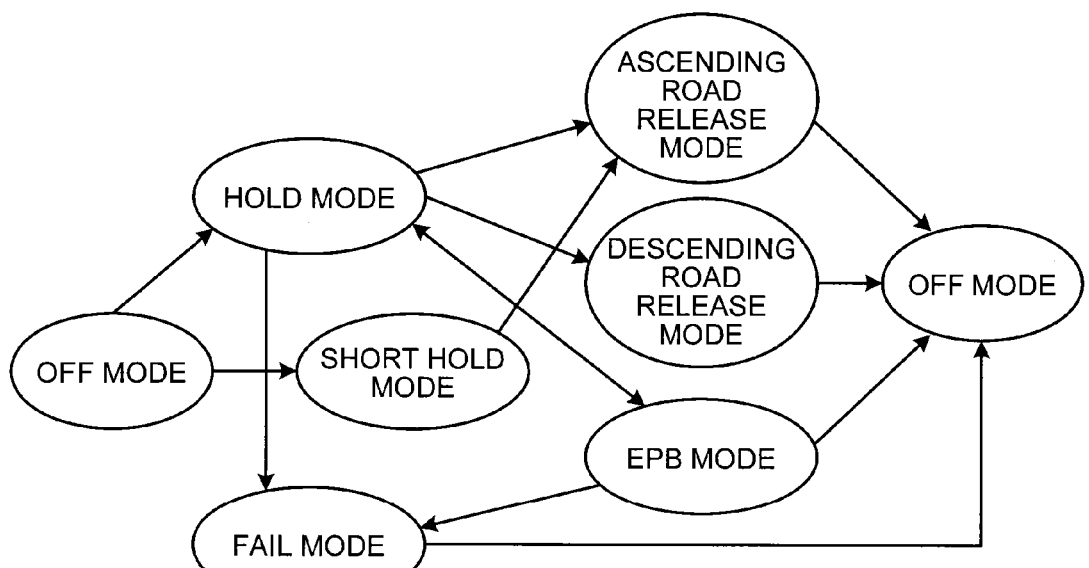
FIG. 18 is an explanatory view showing an operation of the vehicle control system described in FIG. 1.

In the brake hold control (step ST4), the control mode includes a hold mode, a short hold mode, an ascending road release mode, a descending road release mode, an EBP (electrically driven parking brake) mode, a fail mode, and an OFF mode (refer to FIG. 18).

"The hold mode" is a control mode for holding the brake forces of the wheels for a predetermined time. The brake forces are held by a brake force control of the brake force control device 2. The driver can keep the vehicle stop state without depressing the brake pedal by holding the brake forces. A hold time of the brake force in the hold mode is set to, for example, 3 [min]. "The short hold mode" is a control mode for holding the brake forces of the wheels for a short time. The hold time of the brake forces in the short hold mode is set to, for example, 2 [secs]. "The ascending road release mode" is a control mode for releasing the hold of the brake forces of the wheels in the ascending road and the steep ascending road. "The descending road release mode" is a control mode for releasing the hold of the brake forces of the wheels in the descending road and the steep descending road. "The EBP mode" is a control mode for applying brake forces to the vehicle by driving an electrically driven parking brake (not shown). "The fail mode" is a control mode used when a trouble occurs. "The OFF mode" is a mode for finishing the brake hold control by releasing the respective control modes.

When, for example, the vehicle travels (when the vehicle stop flag is OFF), the OFF mode is selected and the brake hold control is prohibited (refer to FIG. 18). In contrast, in the vehicle stop state (when the vehicle stop flag is ON), the short hold mode is selected when the estimated slope road value S is the steep ascending road (step ST2602) (refer to FIG. 15). In the case, after the hold time has passed, the ascending road release mode is selected and thereafter the OFF mode is selected. Further, when the estimated slope road value S is the ascending road (step ST2606), the flat road (step ST2610) and the descending road (step ST2608), the hold mode is selected. In the case, after the hold time has passed, the EBP mode is selected and the OFF mode is selected under the condition that the accelerator pedal is ON. Otherwise, the ascending road release mode or the descending road release mode is selected under the condition that the accelerator pedal is ON and thereafter the OFF mode is selected. Further, when the trouble occurs, the fail mode may be selected. Further, in the case of the steep descending road (step ST2604), the OFF mode is selected.

Note that, as described above, when the estimated slope road value S is the ascending road, the flat road, and the descending road, the hold mode is selected, whereas when the estimated slope road value S is the steep ascending road and the steep descending road, the short hold mode or the OFF mode is selected (refer to FIG. 15). In contrast, when the vehicle travels rearward, the hysteresis of the pre-estimating process in the steep ascending road determination (step ST21) and the steep descending road determination (step ST22) is omitted (steps ST2113 to ST2115 and ST2213 to ST2215) (refer to FIGS. 5 and 6). Thus, a case that it is erroneously determined that the ascending road is the steep ascending road and a case that it is erroneously determined that the descending road is the steep descending road are reduced. With the operation, the brake hold control is appropriately executed.

Note that in the embodiment, while the vehicle is traveling forward, the estimated gradient value G is calculated based on the output signal gx of the acceleration sensor 33 and the output signals Vw of the wheel speed sensors 34FR to 34RL (G=gx−dVw/dt), and while the vehicle travels rearward, the estimated gradient value G is calculated using only the output signal of the front/rear acceleration sensor 33 (G=gx) (steps ST12 and ST14) (refer to FIG. 3).

However, the embodiment is not limited thereto, and while the vehicle is traveling rearward, the estimated gradient value G may be calculated based on the output signal gx of the acceleration sensor 33 and the output signals Vw of the wheel speed sensors 34FR to 34RL (G=gx+dVw/dt), and while the vehicle is traveling forward, the estimated gradient value G may be calculated using only the output signal of the acceleration sensor 33 (not shown). That is, the brake hold control using only the single-function wheel speed sensors 34FR to 34RL becomes possible by calculating the estimated gradient value G using only the output signal of the acceleration sensor 33 in any one travel direction. Note that, in the configuration, a determination process of a travel direction of the vehicle in the slope road estimating process (step ST2) (steps ST2101 and ST2201, refer to FIGS. 5 and 6) is also inverted, and when the vehicle travels rearward, a slope road pre-estimation (steps ST2102 to ST2105 and ST2202 to ST2205) is made (not shown).

EXAMPLE

Figure 19:
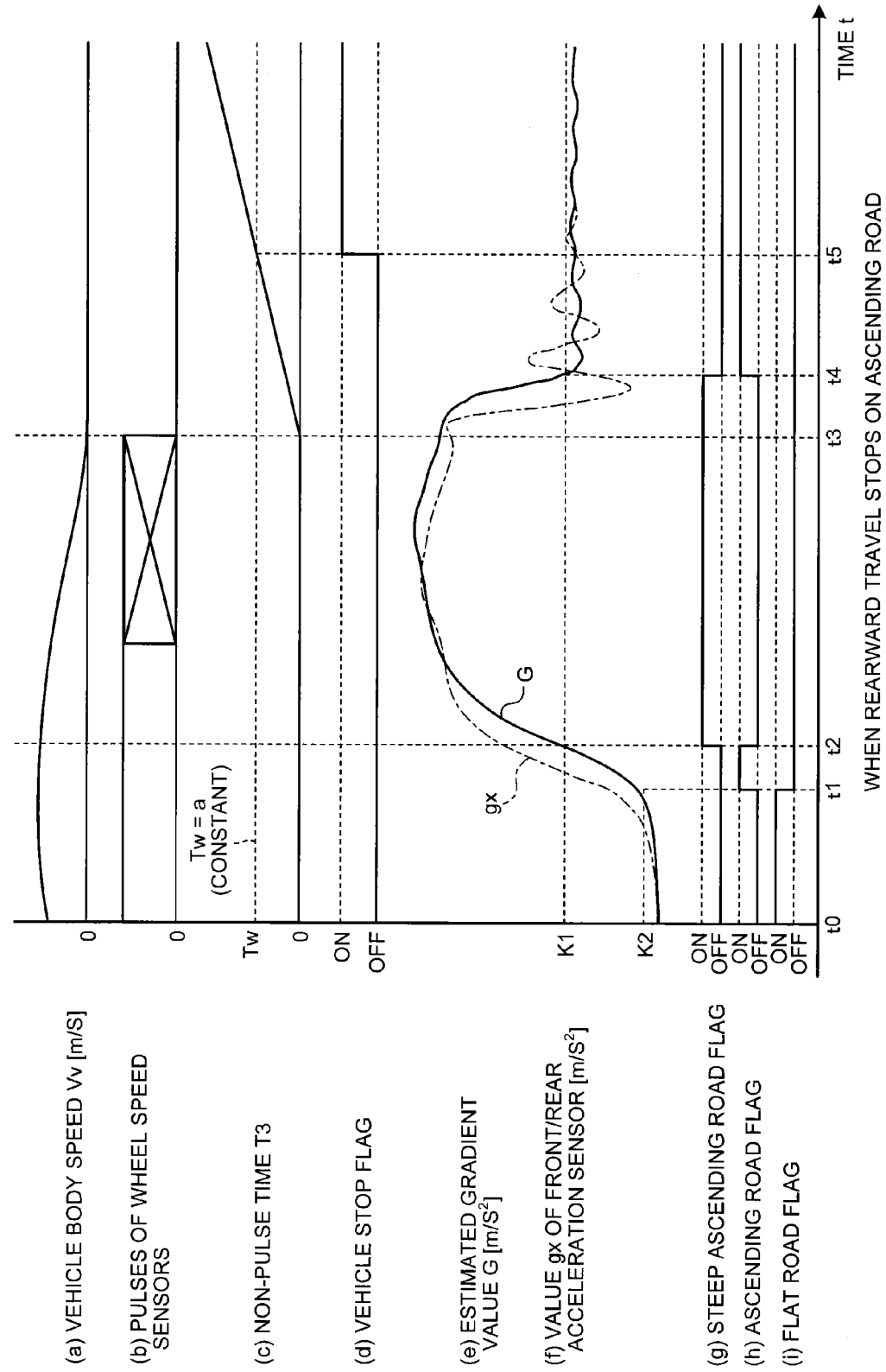
FIG. 19 is a timing chart showing an example of the vehicle control system described in FIG. 1.

FIG. 19 is a timing chart showing an example of the vehicle control system shown in FIG. 1. FIG. 20 is an explanatory view showing the example of the vehicle control system described in FIG. 19. These views show a behavior of the brake hold control when the vehicle travels on the ascending road rearward and stops.

At t=t0, the vehicle is traveling rearward on the flat road (refer to FIG. 19). At the time, the vehicle body speed Vv is Vv≠0, and further the pulses of the wheel speed sensors 34FR to 34RL are not zero (refer to (a) and (b) of FIG. 19). Further, since the vehicle is travelling, the non-pulse time T3 of the wheel speed sensors 34FR to 34RL is 0, and the vehicle stop flag is OFF (refer to (c) and (d) of FIG. 19). Further, the estimated gradient value G is G<k2, the flat road flag is ON (refer to FIG. 15, (e) and (i) FIG. 19).

Note that when the vehicle travels, the control device 4 continuously calculates and updates the estimated gradient value G and the estimated slope road value S (steps ST1 and ST2) (refer to FIG. 2). Further, the control device 4 determines whether or not the vehicle is traveling rearward (step ST11) (refer to FIG. 3). In the example, since the vehicle is traveling rearward, the control device 4 calculates the estimated gradient value G using only the output signal gx of the front/rear acceleration sensor 33 (affirmative determination at steps ST11 and ST14). Further, since the vehicle is traveling rearward, the change rate guard process of the estimated gradient value G (step ST13) is omitted (refer to FIG. 3). Further, since the vehicle is traveling rearward, a hysteresis (affirmative determination at steps ST2101 and ST2102 to ST2105) of an estimating condition in a steep ascending road determination (step ST21) is omitted (refer to FIG. 5). Accordingly, only any one of the steep ascending road flag, the ascending road flag, and the flat road flag becomes ON (refer to (g) to (i) of FIG. 19).

At t=t1, the travel road becomes the ascending road, and the vehicle travels rearward on the ascending road (refer to FIG. 20(a)). Thus, the estimated gradient value G becomes k2<G<k1, the control device 4 sets the flat road flag to OFF and sets the ascending road flag to ON (steps ST2505 and ST2304)(refer to FIGS. 9, 7, 15, and (e), (h) and (i) of FIG. 19).

At t=t2–t3, the driver depresses the brake, and the vehicle is decelerated (refer to (a) of FIG. 19 and (b) of FIG. 20). Thus, the estimated gradient value G is increased depending on the degree of deceleration and k1<G is achieved, and the control device 4 sets the ascending road flag to OFF and sets the steep ascending road flag to ON (steps ST2305 and ST2114) (refer to FIGS. 7, 5, 15, and (e), (g) and (h) FIG. 19). However, an actual travel road at the time is "the ascending road".

At t=t3, the vehicle stops (refer to FIG. 20(c)). Thus, the pulses of the wheel speed sensors 34FR to 34RL become zero, and the control device 4 starts the timer and starts to count the non-pulse time T3 (steps ST31 to ST34) (refer to FIG. 11, and (b) and (c) of FIG. 19). The vehicle stop flag is OFF until the non-pulse time T3 exceeds the determination waiting time Tw (negative determination at step ST34) (refer to FIG. 19(d)). Note that since the vehicle is traveling rearward, the control device 4 sets the determination waiting time Tw to Tw=a (fixed value) (step ST32) (refer to FIG. 11 and FIG. 17).

At t=t3–t5, the pitching vibration is generated by that the vehicle stops (refer to FIG. 20(c)). Thus, the estimated gradient value G is vibrated by a vibration of the output signal gx of the front/rear acceleration sensor 33 and thereafter converged to a true value (refer to (e) and (f) of FIG. 19). Here, at t=t4, k2<G<k1 is achieved, and the control device 4 sets the steep ascending road flag to OFF and sets the ascending road flag to ON (steps ST2114 and ST2304) (refer to FIGS. 5, 7, 15, and (g) and (h) of FIG. 19).

Figure 11:
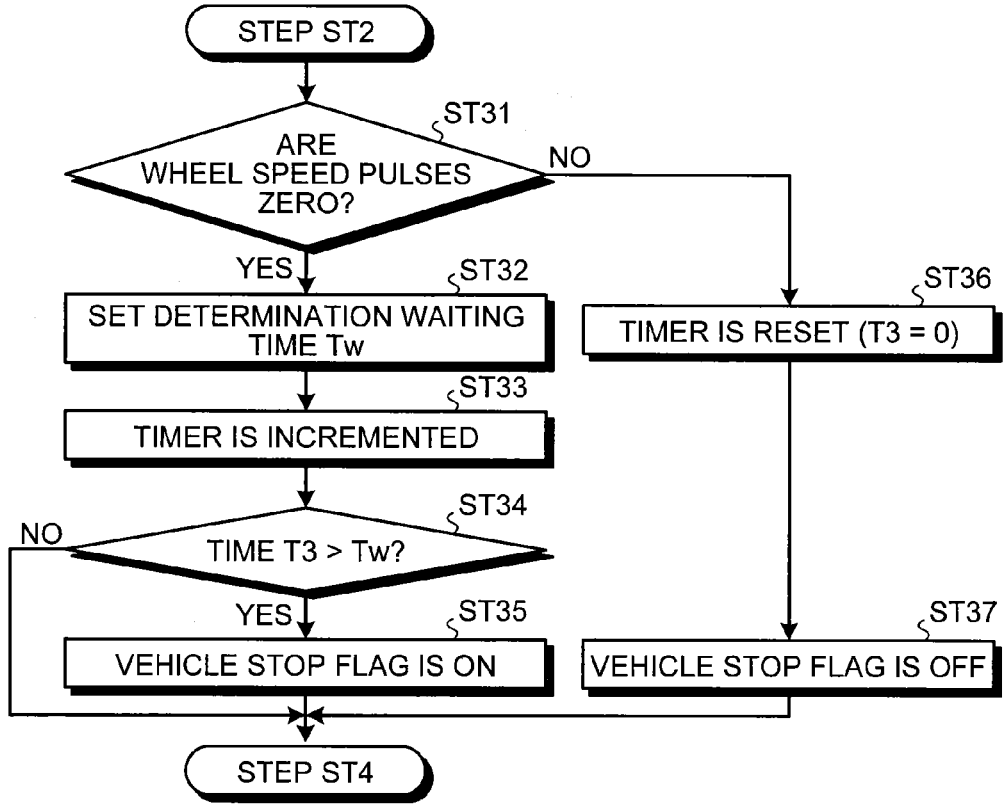
FIG. 11 is a flowchart showing an operation of the vehicle control system described in FIG. 1.
Figure 12:
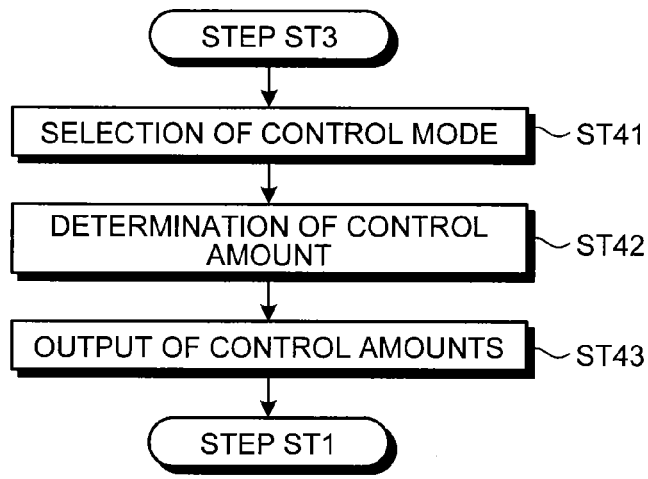
FIG. 12 is a flowchart showing an operation of the vehicle control system described in FIG. 1.

At t=t5, since the non-pulse time T3 has exceeded the determination waiting time Tw, the control device 4 sets the vehicle stop flag to ON (affirmative determination at steps ST34 and ST35) (refer to FIG. 11, and (c) and (d) of FIG. 19). Thus, the control device 4 prohibits to update the estimated slope road value S, and the estimated slope road value S in the vehicle stop state is fixed (affirmative determination at step ST2112, affirmative determination at step ST2212, affirmative determination at step ST2301, affirmative determination at step ST2401, affirmative determination at step ST2501, and negative determination at step ST2609) (refer to FIGS. 5 to 10, and (g) to (i) of FIG. 19).

Thereafter, the control device 4 executes the brake hold control in response to the estimated slope road value S (step ST4) (refer to FIG. 2). Here, since the estimated slope road value S is the ascending road, the control device 4 executes the brake hold control in the hold mode (refer to FIG. 15). With the operation, when the vehicle stops on the ascending road, the stop state of the vehicle is kept and the burden of the brake pedal operation of the driver is reduced.

ADVANTAGES

As described above, the vehicle control system 1 controls the vehicle 10 based on the estimated gradient value G of the travel road (refer to FIG. 1). Further, the vehicle control system 1 includes the acceleration sensor (front/rear acceleration sensor) 33, the wheel speed sensors 34FR to 34RL, and the control device 4 for calculating the estimated gradient value G. Further, when the vehicle travels, the control device 4 determines a travel direction of the vehicle 10 (in the embodiment, whether or not the vehicle is traveling rearward) (step ST11) (refer to FIG. 3). Then, while the vehicle 10 is traveling any one travel direction of a forward direction and a rearward direction (in the embodiment, the vehicle is traveling forward), the control device 4 calculates the estimated gradient value G based on the output signal of the acceleration sensor 33 and the output signals of the wheel speed sensors 34FR to 34RL (affirmative determination at steps ST11 and ST12). In contrast, while the vehicle 10 is traveling in the other travel direction (in the embodiment, the vehicle is traveling rearward), the control device 4 calculates the estimated gradient value G based on the output signal of the acceleration sensor 33 (negative determination at steps ST11 and ST14).

In the configuration, (1) while the vehicle 10 is traveling in one travel direction, the estimated gradient value G is corrected based on the output signals of the wheel speed sensors 34FR to 34RL (affirmative determination at steps ST11 and ST12). With the operation, there is an advantage in that the influence of vibration of the vehicle is reduced and the estimated accuracy of the estimated gradient value G is improved. Further, (2) while the vehicle 10 is traveling in the other travel direction, the estimated gradient value G is calculated based on the output signal of the acceleration sensor 33 without using the output signals of the wheel speed sensors 34FR to 34RL (negative determination at steps ST11 and ST14). Accordingly, when, for example, the wheel speed sensors 34FR to 34RL are the single-function sensors which cannot detect a rotating direction of wheels 11FR to 11RL, an erroneous estimation of the estimated gradient value G due to an erroneous determination of a travel direction of the vehicle can be suppressed. As a result, there is an advantage in that the estimated accuracy of the estimated gradient value G can be improved while employing the single-function wheel speed sensors. In other words, the configuration is particularly beneficial in that the single-function wheel speed sensors can be employed.

Further, in the vehicle control system 1, the control device 4 calculates the estimated gradient value G based on the output signal of the acceleration sensor 33 after the predetermined determination waiting time Tw has passed (after the vehicle stop determination has been fixed) after the output signals of the wheel speed sensors 34FR to 34RL had become zero (steps ST31 to ST35 and ST1) (refer to FIGS. 11 and 3). In the configuration, since the influence of vibration of the vehicle is reduced by that the determination waiting time Tw has passed, there is an advantage that the estimated accuracy of the estimated gradient value G is improved.

Further, in the vehicle control system 1, the control device 4 classifies the travel roads (estimates the estimated slope road value S) by comparing the estimated gradient value G with the predetermined threshold value (refer to FIG. 5 and FIG. 15). At the time, when the control device 4 determines that the vehicle is traveling in one travel direction (in the embodiment, traveling in the forward travel direction), the control device 4 classifies the travel roads by providing the threshold value with the hysteresis (affirmative determination at steps ST2101 and ST2102 to ST2105). In contrast, when the control device 4 determines that the vehicle is traveling in the other travel direction (in the embodiment, traveling in the rearward travel direction), the control device 4 classifies the travel roads using the single threshold value (affirmative determination at steps ST2101 and ST2113 to ST2115).

In the configuration, (1) while the vehicle is traveling in one travel direction (while traveling forward) as well as the estimated gradient value G is in the vicinity of the threshold value, since the slope road estimating process (step ST2) is provided with the hysteresis, the influence of vibration of the vehicle is reduced. As a result, there is an advantage that a classification accuracy of the travel roads (an estimated accuracy of the estimated slope road value S) is improved. In contrast, (2) while the vehicle is traveling in the other travel direction (traveling rearward), since the estimated gradient value G is not corrected by the output signals of the wheel speed sensors, the estimated gradient value G is liable to receive the influence of vibration when the vehicle stops. Accordingly, there is an advantage that the classification flags (for example, the steep ascending road flag and the ascending road flag) are prevented from being set to ON at the same time by that the hysteresis of the slope road estimating process (step ST2) is omitted and the travel roads are classified using only the single threshold value.

Further, in the vehicle control system 1, after the predetermined determination waiting time Tw has passed after the output signals of the wheel speed sensors 34FR to 34RL had become zero, the control device 4 prohibits to update the result of classification of the travel roads (estimated slope road value S) (affirmative determination at step ST2112, affirmative determination at step ST2212, affirmative determination at step ST2301, affirmative determination at step ST2401, affirmative determination at step ST2501, and negative determination at step ST2609) (refer to FIGS. 5 to 10). In the configuration, the result of classification of the travel roads after the determination waiting time Tw has passed from the time at which the vehicle had stopped is obtained. As a result, a situation that the result of classification of the travel roads is changed due to the sway and the like after the vehicle has stopped can be prevented.

REFERENCE SIGNS LIST

1 VEHICLE CONTROL SYSTEM
2 BRAKE FORCE CONTROL DEVICE
21 HYDRAULIC PRESSURE CIRCUIT
22FR to 22RL WHEEL CYLINDER
23 BRAKE PEDAL
24 MASTER CYLINDER
25 SENSOR UNIT
31 SHIFT POSITION SENSOR
32 ACCELERATOR PEDAL SENSOR
33 FRONT/REAR ACCELERATION SENSOR
34FR to 34RL WHEEL SPEED SENSOR
35 CONTROL DEVICE
41 MAIN CONTROL UNIT
42 REARWARD TRAVEL DETERMINING UNIT
43 GRADIENT ESTIMATING UNIT
44 SLOPE ROAD ESTIMATING UNIT
45 BRAKE HOLD CONTROL UNIT
46 STORAGE UNIT
10 VEHICLE
11FR to 11RL WHEEL

The invention claimed is:

1. A vehicle control system for calculating an estimated gradient value of a travel road, comprising:
an acceleration sensor that detects an acceleration of a vehicle;
wheel speed sensors that detect wheel speeds of the vehicle; and
a control device that is configured to:
calculate the estimated gradient value,
determine whether the vehicle travels in a first direction or a second direction opposite to the first direction,
calculate the estimated gradient value based on an output signal of the acceleration sensor and output signals of the wheel speed sensors at a time the control device has determined that the vehicle travels in the first direction, and
calculate the estimated gradient value based on an output signal of the acceleration sensor without using the output signals of the wheel speed sensors at a time the control device has determined that the vehicle travels in the second direction.

2. The vehicle control system according to claim 1, wherein the control device is further configured to calculate the estimated gradient value based on an output signal of the accelerator sensor after a predetermined determination waiting time has passed after output signals of the wheel speed sensors have become zero.

3. The vehicle control system according to claim 2, wherein when the control device classifies travel roads by comparing the estimated gradient value with a predetermined threshold value, the control device is further configured to:
classify the travel roads by providing a hysteresis with the predetermined threshold value when the control device determines that the vehicle is traveling in one of the first direction and the second direction, and
classify the travel roads using a single threshold value when the control device determines that the vehicle is traveling in the other of the first direction and the second direction.

4. The vehicle control system according to claim 3, wherein the control device is further configured to prohibit to update a result of classification of the travel roads after a predetermined determination waiting time has passed after output signals of the wheel speed sensors have become zero.

5. The vehicle control system according to claim 1, wherein when the control device classifies travel roads by comparing the estimated gradient value with a predetermined threshold value, the control device is further configured to:
classify the travel roads by providing a hysteresis with the predetermined threshold value when the control device determines that the vehicle is traveling in one of the first direction and the second direction, and
classify the travel roads using a single threshold value when the control device determines that the vehicle is traveling in the other of the first direction and the second direction.

6. The vehicle control system according to claim 5, wherein the control device is further configured to prohibit to update a result of classification of the travel roads after a predetermined determination waiting time has passed after output signals of the wheel speed sensors have become zero.

* * * * *